US009916030B2

(12) United States Patent
Noguchi et al.

(10) Patent No.: US 9,916,030 B2
(45) Date of Patent: Mar. 13, 2018

(54) DISPLAY

(71) Applicant: Japan Display Inc., Tokyo (JP)

(72) Inventors: Koji Noguchi, Tokyo (JP); Yasuyuki Teranishi, Tokyo (JP); Yoshiyuki Teshirogi, Tokyo (JP); Daisuke Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 87 days.

(21) Appl. No.: 14/938,060

(22) Filed: Nov. 11, 2015

(65) Prior Publication Data

US 2016/0139733 A1 May 19, 2016

(30) Foreign Application Priority Data

Nov. 19, 2014 (JP) ................. 2014-234173

(51) Int. Cl.
G06F 3/045 (2006.01)
G06F 3/041 (2006.01)
G06F 3/044 (2006.01)
G09G 3/36 (2006.01)
G09G 5/18 (2006.01)

(52) U.S. Cl.
CPC ............ G06F 3/0416 (2013.01); G06F 3/044 (2013.01); G06F 3/0412 (2013.01); G09G 3/3648 (2013.01); G06F 2203/04103 (2013.01); G09G 3/3677 (2013.01); G09G 5/18 (2013.01)

(58) Field of Classification Search
CPC ...... G06F 3/0416; G06F 3/0412; G06F 3/044; G06F 2203/04103; G09G 3/3648; G09G 3/3677; G09G 5/18

USPC ....................................................... 345/174
See application file for complete search history.

(56) References Cited

U.S. PATENT DOCUMENTS 9,035,900 B2   5/2015  Azumi et al.
2010/0265210 A1* 10/2010 Nakanishi ........... G02F 1/13338
                                              345/174
2012/0075239 A1*  3/2012  Azumi ................... G06F 3/044
                                              345/174

(Continued)

FOREIGN PATENT DOCUMENTS

JP    2012-068980    4/2012
KR    20140012374    2/2014

OTHER PUBLICATIONS

Korean Office Action dated Aug. 18, 2016 in corresponding Korean Application No. 10-2015-0162808.

Primary Examiner — Nicholas Lee
Assistant Examiner — Ngan T Pham Lu
(74) Attorney, Agent, or Firm — K&L Gates LLP

(57) ABSTRACT

It is an object of the present invention to provide a display capable of improving the detection sensitivity and position resolution even when an input tool has contacted or approached boundary portions of drive ranges or end portions of the display region. The driving electrode driver performs scanning operations for supplying driving signals to one driving electrode or N1 (N1≥2) number of driving electrodes disposed at an end portion on one side of an array. Next, the driving electrode driver repeats scanning operations for supplying the driving signals to the selected N2 (N2≥2) number of driving electrodes a plurality of times by shifting each of the selected N2 number of driving electrodes N3 number by N3 number. N3 is less than N2.

14 Claims, 28 Drawing Sheets

(56) References Cited

U.S. PATENT DOCUMENTS

2015/0153874 A1\* 6/2015 Liu ........................ G06F 3/044
345/174

\* cited by examiner

FIG. 16
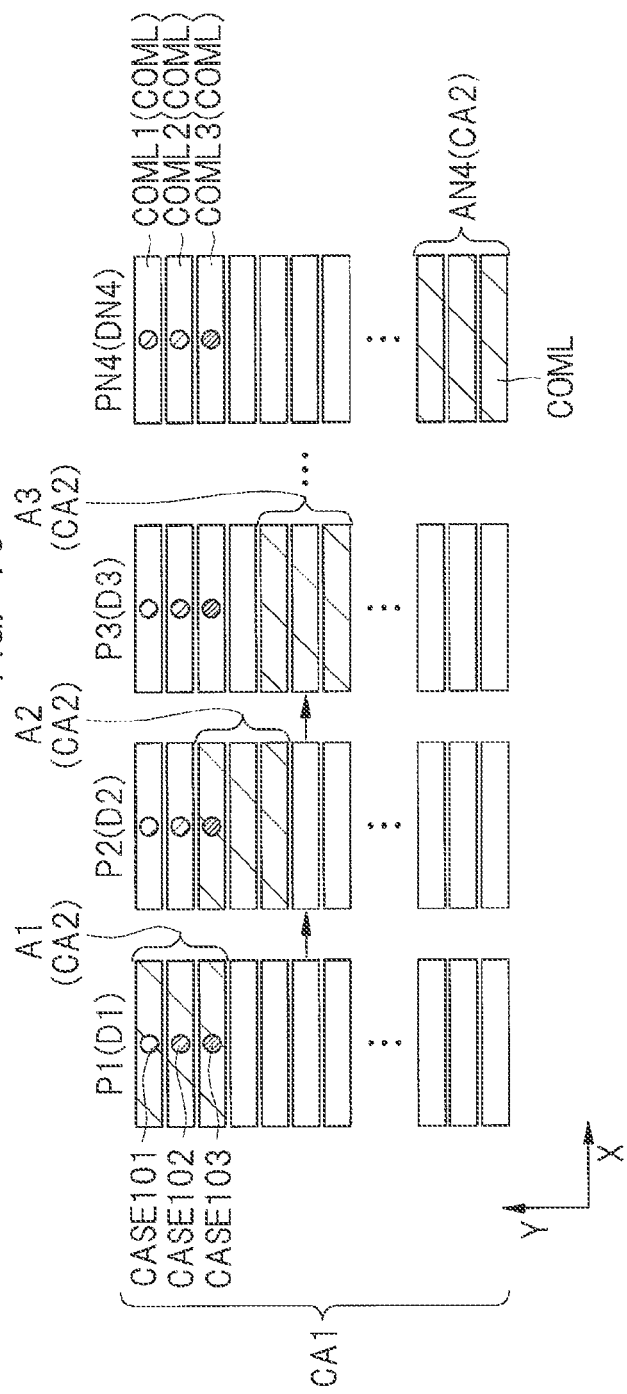
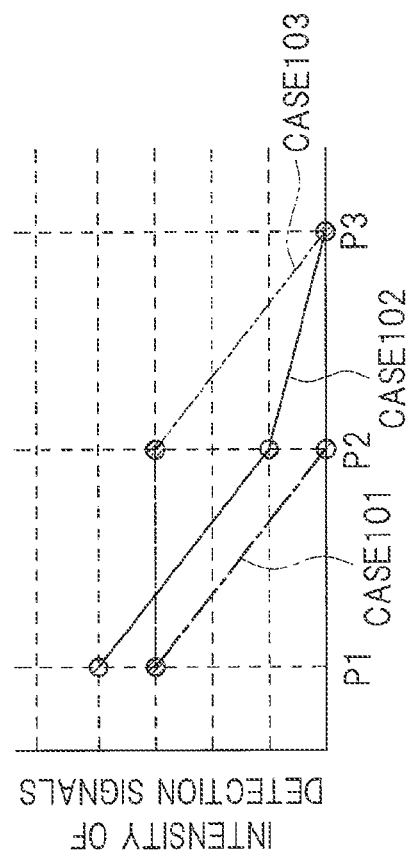

DISPLAY

CROSS REFERENCES TO RELATED APPLICATIONS

The present application claims priority to Japanese Priority Patent Application JP 2014-234173 filed in the Japan Patent Office on Nov. 19, 2014, the entire content of which is hereby incorporated by reference.

FIELD OF THE INVENTION

The present invention relates to a display, and particularly relates to a display having an electrostatic capacitive input device.

BACKGROUND

In recent years, a technique of attaching an input device referred to as a touch panel or a touch sensor to a display surface side of a display and detecting and outputting an input position when input operations are performed by contacting the touch panel with a finger or an input tool such as a touch pen has been known. Since such displays including a touch panel are widely used in portable information terminals such as mobile phones in addition to computers.

One detecting method for detecting contact positions at which a finger or the like has contacted the touch panel is the electrostatic capacitance method. In an electrostatic capacitive touch panel, a plurality of capacitive elements each made up of a pair of electrodes disposed to be opposed to each other with a dielectric layer interposed therebetween, that is, made up of a driving electrode and a detection electrode are provided in a plane of the touch panel. Then, the input positions are detected by utilizing the characteristics that the electrostatic capacitance of capacitive elements changes when performing input operations by contacting the capacitive elements with a finger or an input tool such as a touch pen.

For example, Japanese Patent Application Laid-Open No. 2012-68980 (Patent Document 1) describes a technology for performing scanning by sequentially selecting, in a time-sharing manner, a predetermined plurality number of electrodes to be driven from among a plurality of driving electrodes disposed in parallel to extend in one direction, and by applying touch detection driving signals to the selected electrodes to be driven for detecting an object approaching from the exterior.

SUMMARY

A range for performing scanning with a single scanning operation in an array comprised of a plurality of driving electrodes is defined to be a drive range. At this time, when two adjoining drive ranges do not overlap each other, and an input tool has contacted or approached a boundary portion of two adjoining drive ranges, the intensity of detection signals in both of the two drive ranges will become weak. In such a case, the detection sensitivity is reduced, and as a result, the position resolution of the detected input position is reduced.

The number of scanning operations in which driving electrodes disposed at end portions of an array comprised of a plurality of driving electrodes are included is less than the number of scanning operations in which driving electrodes disposed at a central portion of the array are included. Accordingly, since the number of pieces of information for obtaining input positions through calculation will become less, the sensitivity and position resolution when an input tool has contacted or approached driving electrodes disposed at end portions of an array comprised of a plurality of driving electrodes are reduced when compared to the sensitivity and position resolution when an input tool has contacted or approached driving electrodes disposed at a central portion of the array.

The present invention has been made for solving the above-described problems of the prior art, and it is an object of the present invention to provide a display capable of improving the detection sensitivity and position resolution even when an input tool has contacted or approached boundary portions of drive ranges or end portions of a display region.

The following is a brief description of an outline of the typical invention disclosed in the present application.

A display as an embodiment of the present invention includes a first substrate, a group of pixels comprised of a plurality of pixels provided on the first substrate, a plurality of first electrodes respectively overlapping the group of pixels when seen in a plan view, and a plurality of second electrodes respectively overlapping the group of pixels when seen in a plan view. Further, the display includes a driving unit supplying driving signals to the plurality of first electrodes, and a detection unit detecting an input position based on electrostatic capacities between the plurality of second electrodes and the plurality of first electrodes. The plurality of first electrodes respectively extend in a first direction when seen in a plan view, and are disposed in a second direction intersecting with the first direction, and the plurality of second electrodes respectively extend in the second direction when seen in a plan view, and are disposed in the first direction. The driving unit performs first driving operations for supplying the driving signals to a first electrode disposed at a first end portion on a first side in the second direction of a first array comprised of the plurality of first electrodes, or to each of a first number of first electrodes of two or more electrodes including the first electrode disposed at the first end portion of the first array. Further, the driving unit performs second driving operations for supplying the driving signals to each of a second number of first electrodes selected from among the plurality of first electrodes. The driving unit repeats the second driving operations a plurality of times by shifting each of the selected second number of first electrodes a third number by a third number in the second direction. The second number is two or more, the first number of first electrodes in the first driving operations are disposed successively in the second direction, the second number of first electrodes in the second driving operations are disposed successively in the second direction, and the third number is less than the second number.

Further, a display as an embodiment of the present invention includes a first substrate, a group of pixels comprised of a plurality of pixels provided on the first substrate, a plurality of first electrodes respectively overlapping the group of pixels when seen in a plan view, and a plurality of second electrodes respectively overlapping the group of pixels when seen in a plan view. Further, the display includes a driving unit supplying driving signals to the plurality of first electrodes, and a detection unit detecting an input position based on electrostatic capacities between the plurality of second electrodes and the plurality of first electrodes. The plurality of first electrodes respectively extend in a first direction when seen in a plan view, and are disposed in a second direction intersecting with the first direction, and the plurality of second electrodes respectively extend in the second direction when seen in a plan view, and are disposed in the first direction. The driving unit performs first driving operations for supplying the driving signals to a first electrode disposed at a first end portion on a first side in the second direction of a first array comprised of the plurality of first electrodes, or to each of two first electrodes including the first electrode disposed at the first end portion of the first array. Further, the driving unit performs second driving operations for supplying the driving signals respectively to a first electrode disposed at a second end portion on the first side in the second direction of a second array comprised of three first electrodes selected from among the plurality of first electrodes, and to a first electrode disposed at a third end portion on an opposite side of the first side in the second direction of the second array. The driving unit repeats the second driving operations a plurality of times by shifting each of the selected three first electrodes two by two in the second direction. The two first electrodes in the first driving operations are disposed successively in the second direction, and the three first electrodes in the second driving operations are disposed successively in the second direction.

Additional features and advantages are described herein, and will be apparent from the following Detailed Description and the figures.

BRIEF DESCRIPTION OF THE FIGURES

FIG. 16 is a diagram showing an operation example of scanning operations in a display according to Comparative Example 2;

DETAILED DESCRIPTION

Figure 1:
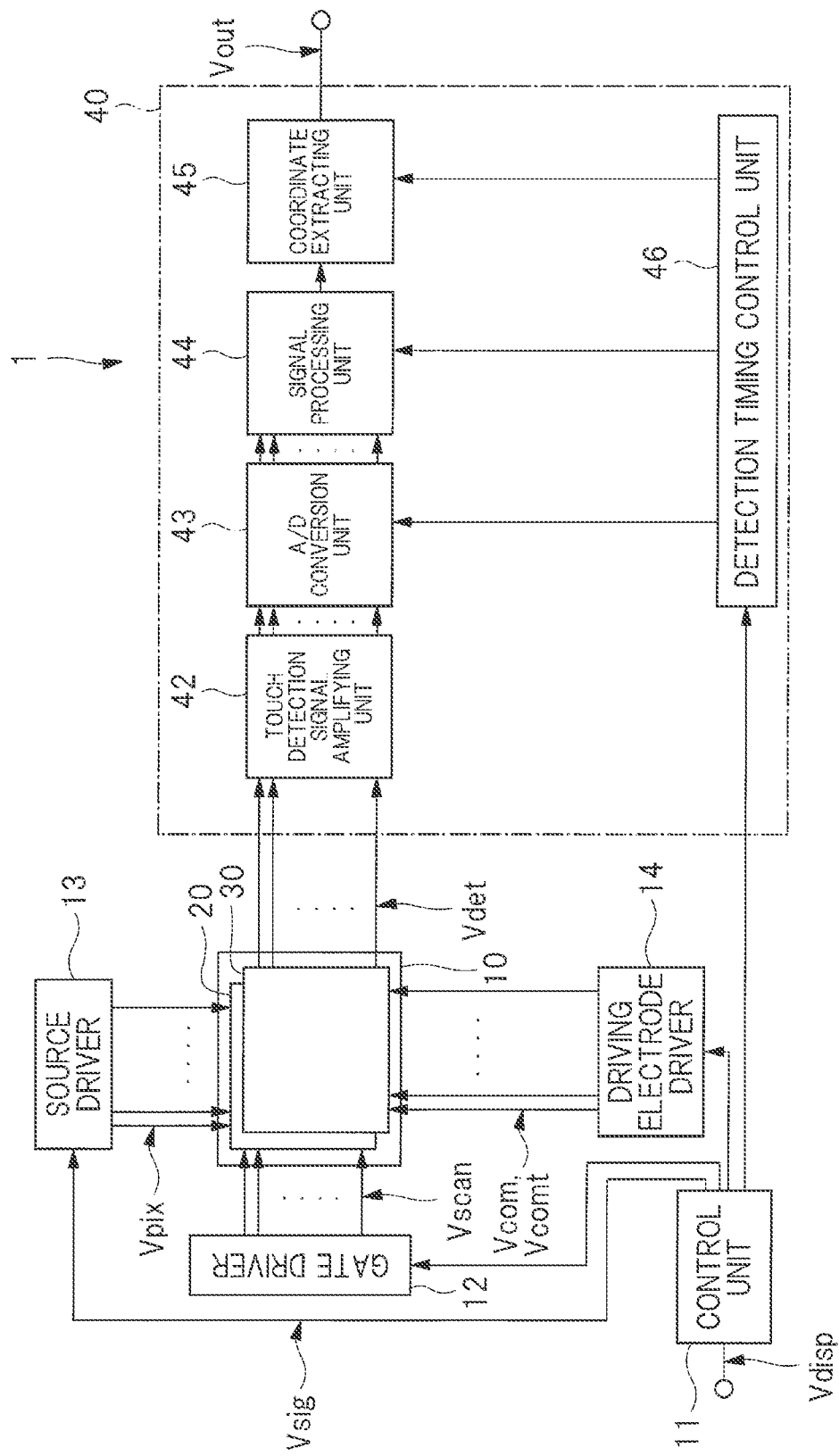
FIG. 1 is a block diagram showing one configuration example of a display according to a first embodiment.

Hereinafter, embodiments of the present invention will be described with reference to drawings.

Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

Further, in some drawings used in the embodiments, hatching that is used for distinguishing components may be omitted depending on the drawing.

First Embodiment

First, an example in which a display provided with a touch panel as an input device is applied to a liquid crystal display with touch detection functions of in cell type will be explained as a first embodiment.

In the present specification, an input device is an input device which detects electrostatic capacities which change at least depending on capacities of objects that approach or contact electrodes. Here, the method for detecting electrostatic capacities is not limited to the mutual capacity method in which electrostatic capacities between two electrodes are detected but also includes the self-capacity method in which electrostatic capacities of a single electrode are detected. Further, a liquid crystal display with touch detection functions is a liquid crystal display provided with detection electrodes for touch detection on either a first substrate or a second substrate which form a display unit. Moreover, in the first embodiment, a display with touch detection functions of in cell type characterized in that driving electrodes operate as driving electrodes of the display unit and as driving electrodes of the input device will be described.

In this respect, it is also possible to apply a display provided with a touch panel as an input device to a liquid crystal display with touch detection functions of in cell type in which driving electrodes COML of the display are formed separately from driving electrodes of the input device.

Overall Configuration

First, the overall configuration of the display according to the first embodiment will be described with reference to FIG. 1. FIG. 1 is a block diagram showing one configuration example of a display according to the first embodiment.

A display 1 is provided with a display device with touch detection functions 10, a control unit 11, a gate driver 12, a source driver 13, a driving electrode driver 14, and a touch detection unit 40.

The display device with touch detection functions 10 includes a display device 20 and a touch detection device 30. In the first embodiment, the display device 20 is a display device using liquid crystal display elements as display elements. Accordingly, the display device 20 might also be referred to as a liquid crystal display device 20 in the following descriptions. The touch detection device 30 is a touch detection device of electrostatic capacity method, namely a touch detection device of electrostatic capacity type. Therefore, the display 1 is a display provided with an input device with touch detection functions. The display device with touch detection functions 10 is a display device in which the liquid crystal display device 20 and the touch detection device 30 are integrated, and is a display device incorporating touch detection functions, namely, a display device with touch detection functions of in cell type.

Further, the display device with touch detection functions 10 may be a display device in which the touch detection device 30 is attached on the display device 20. Further, the display device 20 may be an organic EL (Electroluminescence) display device instead of a display device using liquid crystal display elements.

The display device 20 performs display by sequentially scanning each horizontal line in the display region in accordance with scanning signals Vscan supplied from the gate driver 12. The touch detection device 30 operates in accordance with a principle of electrostatic capacitive type touch detection and outputs detection signals Vdet, as will be described later.

The control unit 11 is a circuit which respectively supplies control signals to the gate driver 12, the source driver 13, the driving electrode driver 14 and the touch detection unit 40 based on video signals Vdisp supplied from the exterior to perform control so that they are operated in synchronization with each other.

The gate driver 12 has a function of sequentially selecting one horizontal line, which is an object of display driving of the display device with touch detection functions 10, based on control signals supplied from the control unit 11.

The source driver 13 is a circuit which supplies pixel signals Vpix to sub-pixels SPix (see FIG. 7 to be described later) included in the display device with touch detection functions 10 based on control signals of image signals Vsig supplied from the control unit 11.

The driving electrode driver 14 is a circuit as a driving unit which supplies driving signals Vcom and driving signals Vcomt to driving electrodes COML (see FIG. 5 or FIG. 6 to be described later) included in the display device with touch detection functions 10 based on control signals supplied from the control unit 11.

The touch detection unit 40 is a circuit which detects presence/absence of touches of a finger or an input tool such as a touch pen to the touch detection device 30, namely, presence/absence of a state of contact or approach to be described later based on control signals supplied from the control unit 11 and detection signals Vdet supplied from the touch detection device 30 of the display device with touch detection functions 10. Also, the touch detection unit 40 is a circuit which obtains coordinates of touches, namely input positions in the touch detection region in the case where the touches are present. The touch detection unit 40 is provided with a touch detection signal amplifying unit 42, an A/D (Analog/Digital) conversion unit 43, a signal processing unit 44, a coordinate extracting unit 45 and a detection timing control unit 46.

The touch detection signal amplifying unit 42 amplifies detection signals Vdet supplied from the touch detection device 30. The touch detection signal amplifying unit 42 may be provided with a low pass analog filter which removes high frequency components, namely, noise components included in the detection signals Vdet and extracts and respectively outputs touch components.

Principle of Electrostatic Capacity Type Touch Detection

Figure 2:
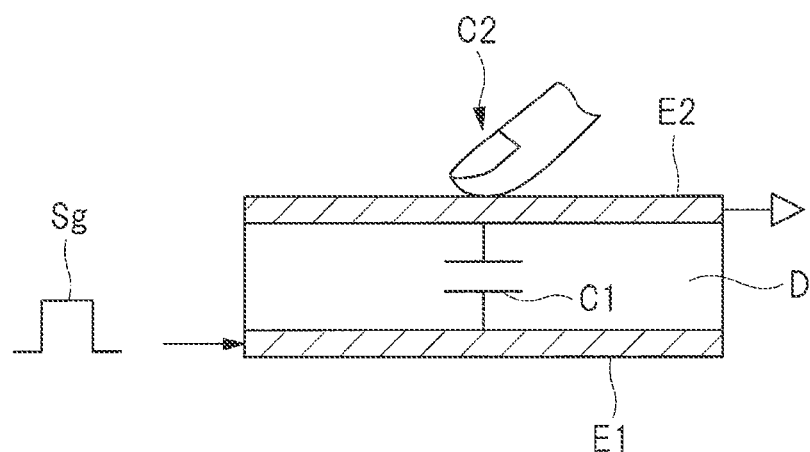
FIG. 2 is an explanatory view showing a state of a finger which has contacted or approached a touch detection device.
Figure 3:
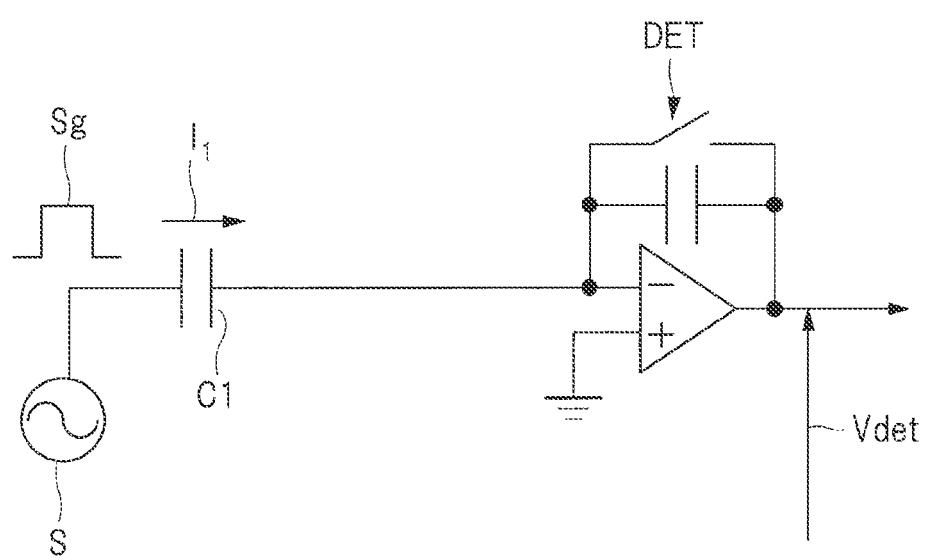
FIG. 3 is an explanatory view showing an example of an equivalent circuit in a state of the finger which has contacted or approached the touch detection device.
Figure 4:
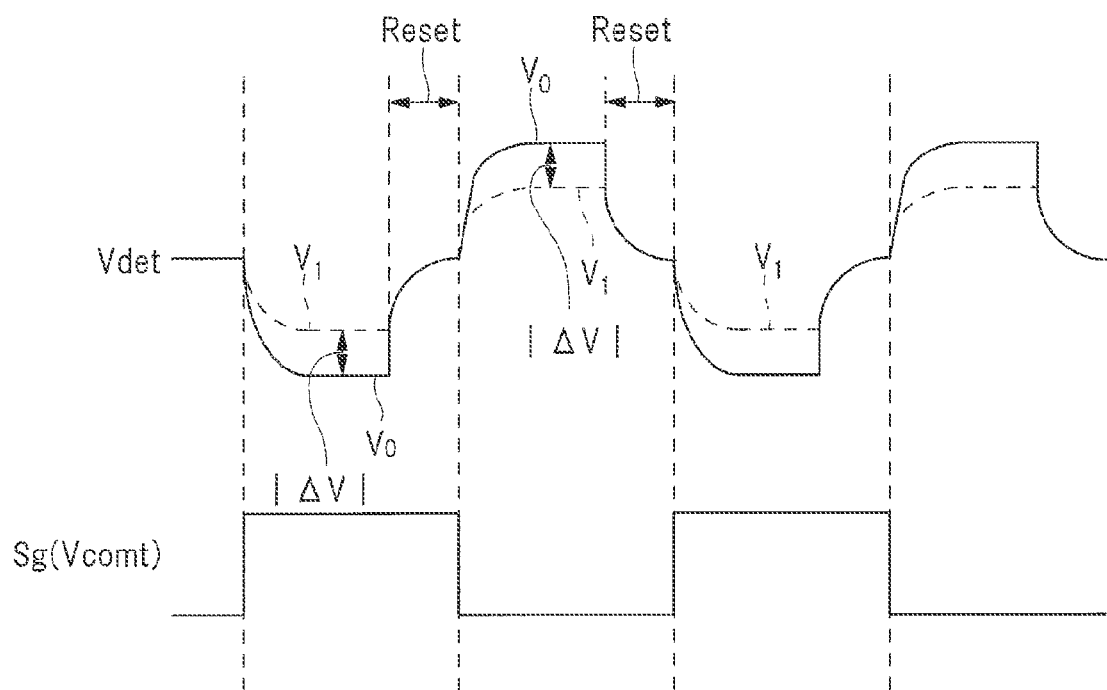
FIG. 4 is a diagram showing examples of waveforms of driving signals and detection signals.

A principle of touch detection in the display 1 according to the first embodiment will be explained with reference to FIG. 1 to FIG. 4. FIG. 2 is an explanatory view showing a state of a finger which has contacted or approached the touch detection device. FIG. 3 is an explanatory view showing an example of an equivalent circuit in a state of the finger which has contacted or approached the touch detection device. FIG. 4 is a diagram showing examples of waveforms of driving signals and detection signals.

In this respect, in the present description, the term "approached" indicates a state in which an input tool such as a finger which has not directly contacted the touch detection device but is in a state approaching the same such that the intensity of the detection signals will be a preliminarily determined threshold value or more.

As shown in FIG. 2, in electrostatic capacity type touch detection, an input device referred to as a touch panel or touch sensor includes driving electrodes E1 and detection electrodes E2 disposed to oppose each other with a conductive body D being interposed therebetween. Capacitive elements C1 are formed by the driving electrodes E1 and the detection electrodes E2. As shown in FIG. 3, one ends of the capacitive elements C1 are connected to an alternating signal source S as a driving signal source while the other ends of the capacitive elements C1 are connected to a voltage detector DET which is the touch detection unit. The voltage detector DET includes, for example, an integrating circuit included in the touch detection signal amplifying unit 42 shown in FIG. 1.

When alternating rectangular waves Sg having, for example, a frequency in the range of several kHz to several hundreds of kHz are applied from the alternating signal source S to the one ends of the capacitive elements C1, namely to the driving electrodes E1, detection signals Vdet which are output waveforms are generated by means of voltage detector DET connected to the other ends of the capacitive elements C1, namely to the detection electrodes E2 side. In this respect, the alternating rectangular waves Sg correspond to the driving signals Vcom which are, for example, shown in FIG. 4.

In a state no finger has contacted or approached, namely in a non-contact state, current $I_1$ corresponding to the capacity value of the capacitive elements C1 is made to flow in accordance with discharge and charge of the capacitive elements C1 as shown in FIG. 3. The voltage detector DET converts fluctuations in the current $I_1$ in accordance with the alternating rectangular waves Sg into fluctuations in voltage. These voltage fluctuations are shown as waveforms $V_0$ indicated by solid lines in FIG. 4.

On the other hand, in a state a finger has contacted or approached, namely in a contact state, the capacity value of the capacitive elements C1 which are formed of the driving electrodes E1 and detection electrodes E2 becomes small being affected by the electrostatic capacity C2 which is formed by the finger. Accordingly, the current $I_1$ flowing through the capacitive elements C1 as shown in FIG. 3 fluctuates. The voltage detector DET converts fluctuations in the current $I_1$ in accordance with the alternating rectangular waves Sg into fluctuations in voltage. These voltage fluctuations are shown as waveforms $V_1$ indicated by broken lines in FIG. 4. In this case, the amplitude of waveforms $V_1$ is smaller than that of the above-described waveforms $V_0$. Thus, absolute values $|\Delta V|$ of voltage differences between the waveforms $V_0$ and waveforms $V_1$ will change in accordance with influences of an object such as a finger which approaches from the exterior. In this respect, in order to accurately detect absolute values $|\Delta V|$ of voltage differences between the waveforms $V_o$ and waveforms $V_1$, it is preferable that the voltage detector DET operates while providing periods Reset during which discharge and charge of the condenser is reset so as to match frequencies of the alternating rectangular waves Sg through switching within the circuit.

In the example shown in FIG. 1, the touch detection device 30 performs touch detection for each drive range including one or a plurality of driving electrodes COML (see FIG. 5 or FIG. 6 to be described later) in accordance with driving signals Vcom which are supplied from the driving electrode driver 14. Namely, the touch detection device 30 outputs detection signals Vdet by means of the voltage detector DET shown in FIG. 3 for each drive range including one or each of the plurality of the driving electrodes COML, and the output detection signals Vdet are supplied to the touch detection signal amplifying unit 42 of the touch detector unit 40.

The A/D conversion unit 43 is a circuit which performs sampling of respective analog signals which are output from the touch detection signal amplifying unit 42 at timings which are in sync with the detection signals Vdet and converts them into digital signals.

The signal processing unit 44 is provided with a digital filter for reducing frequency components other than frequencies of which driving signals Vcom have been sampled, namely noise components, included in the output signals of the A/D conversion unit 43. The signal processing unit 44 is a logic circuit which detects the presence/absence of touch with respect to the touch detection device 30 based on output signals of the A/D conversion unit 43. The signal processing unit 44 performs processes of extracting only differential voltages caused by the finger. The differential voltages caused by the finger are the above-described absolute values $|\Delta V|$ of differences between the waveforms $V_0$ and waveforms $V_1$. It is also possible that the signal processing unit 44 performs calculations of averaging absolute values $|\Delta V|$ per each drive range to obtain average values of the absolute values $|\Delta V|$. Thus, the signal processing unit 44 can reduce influences of noise. The signal processing unit 44 compares the detected differential voltage caused by the finger with a predetermined threshold voltage, and when the voltage is not less than the threshold voltage, it is determined that a contact state of an externally approaching object approaching from the exterior is present, and when it is less than the threshold voltage, it is determined that a non-contact state of an externally approaching object is present. In this manner, touch detection is performed by the touch detection unit 40.

The coordinate extracting unit 45 is a logic circuit which obtains coordinates of a position at which touch has been detected, namely an input position on the touch panel upon detection of a touch by the signal processing unit 44. The detection timing control unit 46 performs control such that the A/D conversion unit 43, the signal processing unit 44 and the coordinate extracting unit 45 operate in sync with each other. The coordinate extracting unit 45 outputs the touch panel coordinates as signal outputs Vout.

Module

Figure 5:
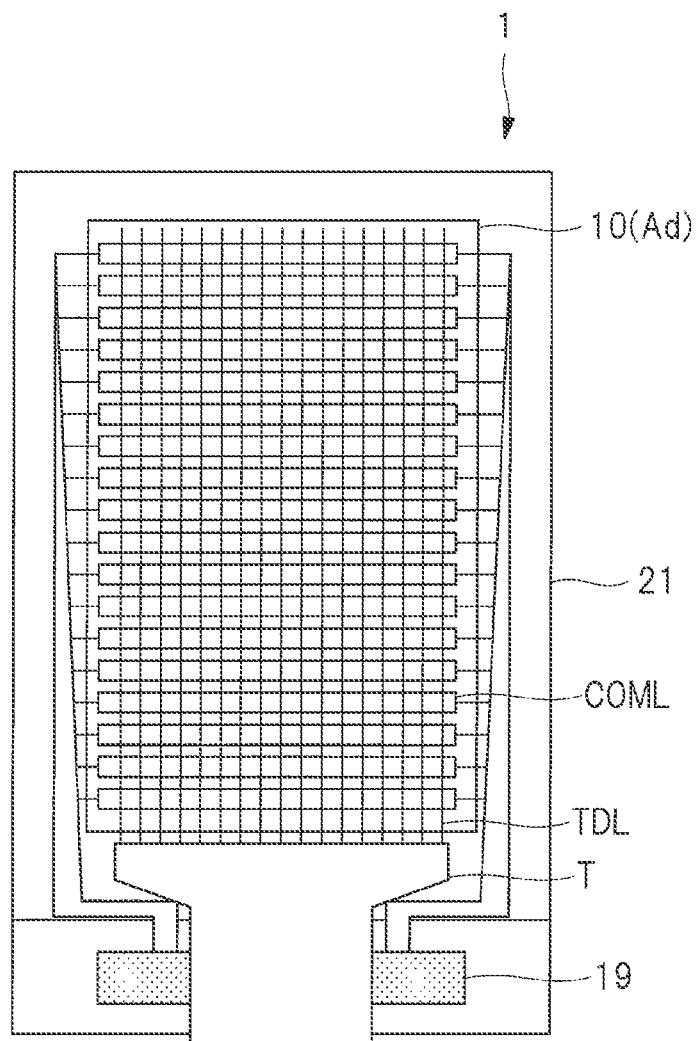
FIG. 5 is a plan view showing one example of a module mounted with the display according to the first embodiment.

FIG. 5 is a plan view showing one example of a module mounted with the display according to the first embodiment.

As shown in FIG. 5, the display 1 includes a display device with touch detection functions 10, a COG (Chip on Glass) 19 and a substrate 21.

The display device with touch detection functions 10 includes a plurality of driving electrodes COML and a plurality of detection electrodes TDL. Here, two directions which intersect with each other and which are preferably orthogonal within the upper surface as a main surface of the substrate 21 are defined as an X axis direction and a Y axis direction. At this time, each of the plurality of driving electrodes COML extends in the X axis direction and is arrayed in the Y axis direction when seen in a plan view. Further, each of the plurality of detection electrodes TDL extends in the Y axis direction and is arrayed in the X axis direction when seen in a plan view. Accordingly, each of the plurality of detection electrodes TDL intersects with each of the plurality of driving electrodes COML when seen in a plan view. Here, a region in which the display device with touch detection functions 10 is formed is the same region as a display region Ad in which an image is displayed.

Here, in the present specification, the expression "when seen in a plan view" indicates that objects are seen from a direction perpendicular to the upper surface as the main surface of the substrate 21.

As it will be described later using FIG. 7, each of the plurality of driving electrodes COML is provided to overlap a plurality of sub-pixels SPix arrayed in the X axis direction when seen in a plan view. Namely, one driving electrode COML is provided as a common electrode of the plurality of sub-pixels SPix.

In the example shown in FIG. 5, the display device with touch detection functions 10 has a rectangular shape including two sides respectively extending in the X axis direction and two sides respectively extending in the Y axis direction when seen in a plan view. A terminal unit T made up of a flexible substrate, etc. is provided on one side of the display device with touch detection functions 10 in the Y axis direction. The detection electrodes TDL are connected to the touch detection unit 40 (see FIG. 1) mounted to the exterior of the module via the terminal unit T. The COG 19 is a chip mounted to the substrate 21, and incorporates circuits necessary for display operations such as the control unit 11, the gate driver 12 or the source driver 13 as shown in FIG. 1. The COG 19 might also incorporate the driving electrode driver 14.

Display Device with Touch Detection Functions

Figure 6:
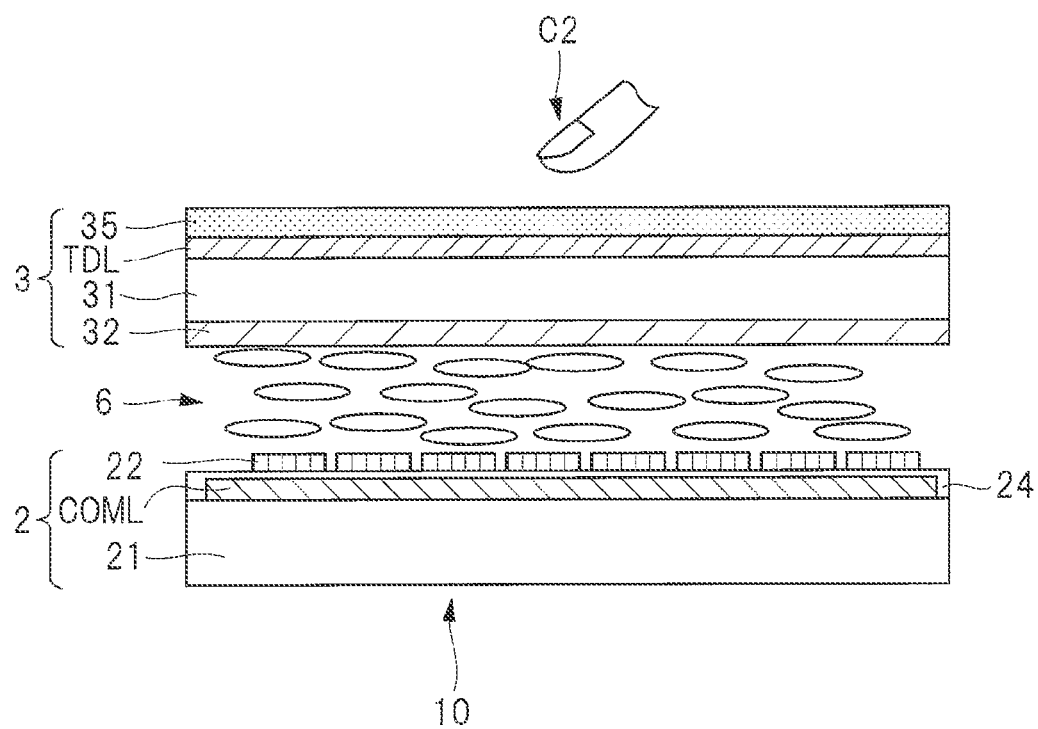
FIG. 6 is a cross-sectional view showing a display device with touch detection functions of the display according to the first embodiment.

Next, a configuration example of the display device with touch detection functions 10 will be explained with reference to FIG. 5 to FIG. 8. FIG. 6 is a cross-sectional view showing a display device with touch detection functions of the display according to the first embodiment. FIG. 7 is a circuit diagram showing a display device with touch detection functions of the display according to the first embodiment. FIG. 8 is a perspective view showing one configuration example of driving electrodes and detection electrodes of the display according to the first embodiment.

The display device with touch detection functions 10 includes an array substrate 2, an opposing substrate 3 and a liquid crystal layer 6. The opposing substrate 3 is disposed to be opposed to the array substrate 2 such that the upper surface as the main surface of the array substrate 2 and the lower surface as the main surface of the opposing substrate 3 oppose each other. The liquid crystal layer 6 is provided between the array substrate 2 and the opposing substrate 3. Namely, the liquid crystal layer 6 is interposed between an upper surface of the substrate 21 and a lower surface of a substrate 31.

The array substrate 2 includes the substrate 21. Further, the opposing substrate 3 includes the substrate 31. The substrate 31 includes an upper surface as one main surface and a lower surface as the other main surface on the opposite side of the upper surface, and is disposed to be opposed to the substrate 21 such that the upper surface as the main surface of the substrate 21 and the lower surface as the main surface of the substrate 31 oppose each other.

Figure 7:
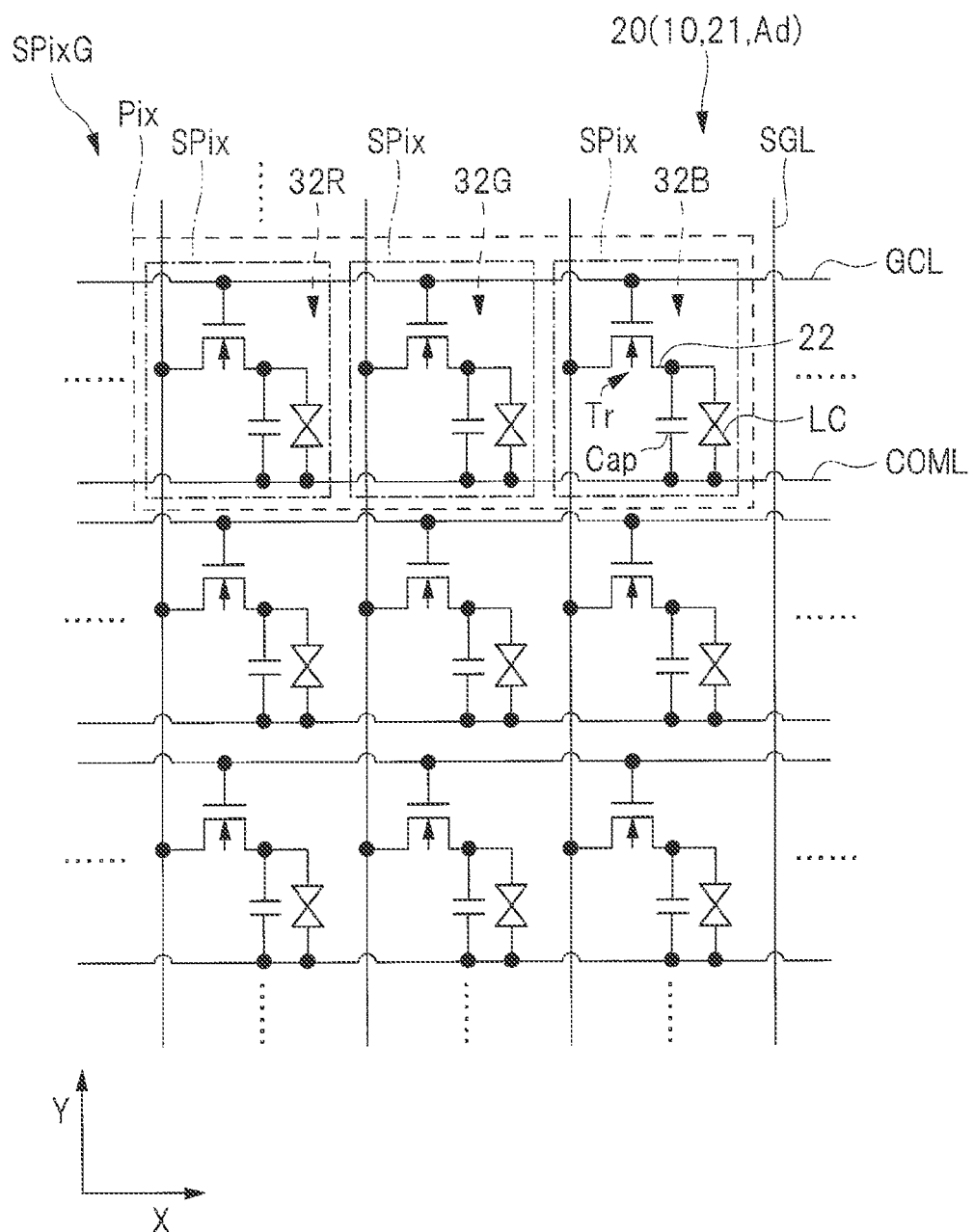
FIG. 7 is a circuit diagram showing a display device with touch detection functions of the display according to the first embodiment.
Figure 8:
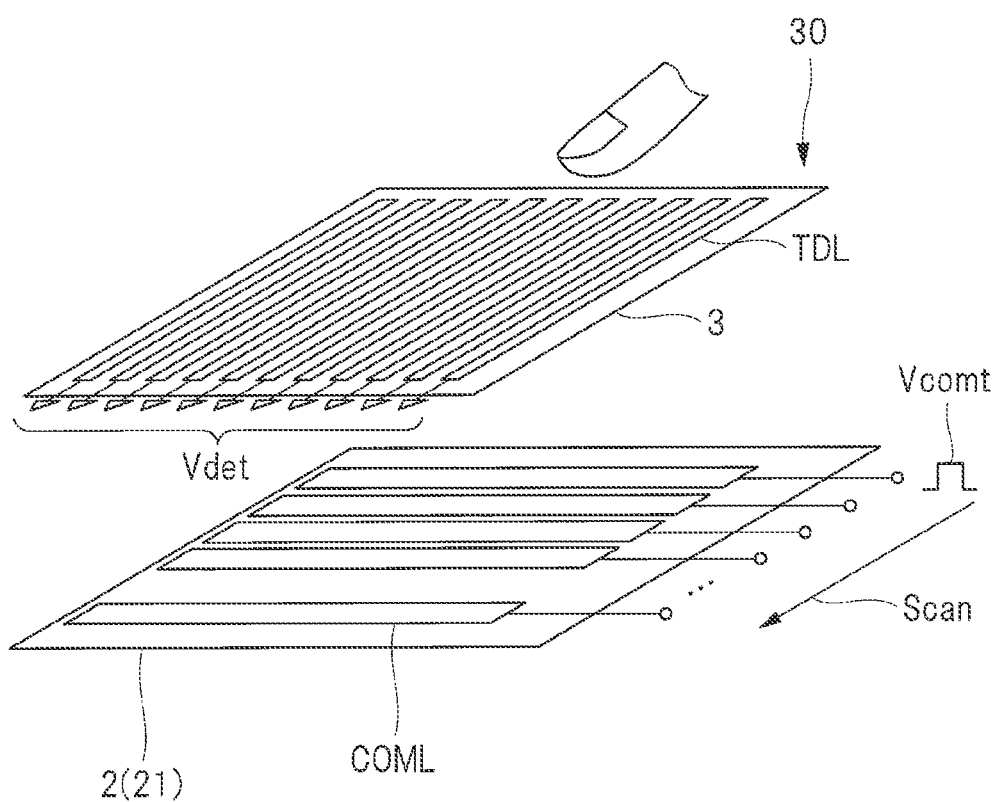
FIG. 8 is a perspective view showing one configuration example of driving electrodes and detection electrodes of the display according to the first embodiment.

As shown in FIG. 7, in the display region Ad, the substrate 21 is formed with a plurality of scanning lines GCL, a plurality of signal lines SGL and a plurality of TFT elements Tr which are thin film transistors (TFT). In this respect, in FIG. 6, illustration of the scanning lines GCL, the signal lines SGL and the TFT elements Tr is omitted. Further, the scanning lines indicate gate wirings and the signal lines indicate source wirings.

As shown in FIG. 7, each of the plurality of scanning lines GCL extends in the X axis direction and is arrayed in the Y axis direction in the display region Ad. Each of the plurality of signal lines SGL extends in the Y axis direction and is arrayed in the X axis direction in the display region Ad. Accordingly, each of the plurality of signal lines SGL intersects with the plurality of scanning lines GCL when seen in a plan view. In this manner, sub-pixels SPix are disposed at intersections of the plurality of scanning lines GCL and the plurality of signal lines SGL which mutually intersect with each other when seen in a plan view and a single pixel Pix is formed by a plurality of sub-pixels SPix of different colors. Namely, the plurality of sub-pixels SPix are provided on the upper surface of the substrate 21, and disposed within the display region Ad when seen in a plan view and arrayed in a matrix-like shape in the X axis direction and the Y axis direction. A group of pixels SPixG is comprised of the plurality of sub-pixels SPix. Namely, the group of pixels SPixG is comprised of the plurality of sub-pixels SPix provided on the substrate 21.

The TFT elements Tr are formed at intersecting portions at which each of the plurality of scanning lines GCL and each of the plurality of signal lines SGL intersect when seen in a plan view. Accordingly, in the display region Ad, the plurality of TFT elements Tr are formed on the substrate 21, and the plurality of TFT elements Tr are arrayed in a matrix-like form in the X axis direction and the Y axis direction. Namely, each of the plurality of sub-pixels SPix is provided with a TFT element Tr. In addition to the TFT elements Tr, each of the plurality of sub-pixels SPix is provided with a liquid crystal element LC.

The TFT elements Tr are composed, for example, of a thin film transistor as a MOS (Metal Oxide Semiconductor) of n-channel type. Gate electrodes of the TFT elements Tr are connected with the scanning lines GCL. Either one of a source electrode or a drain electrode of the TFT element Tr is connected with the scanning line GCL. The other one of the source electrode or the drain electrode of the TFT element Tr is connected with one end of the liquid crystal element LC. In the liquid crystal element LC, for example, one end thereof is connected with the source electrode or the drain electrode of the TFT element Tr while the other end is connected with the driving electrode COML.

As shown in FIG. 6, the array substrate 2 includes the substrate 21, the plurality of driving elements COML, an insulating film 24 and a plurality of pixel electrodes 22. The plurality of driving electrodes COML are provided on the upper surface as the other main surface of the substrate 21 within the display region Ad when seen in a plan view. The insulating film 24 is formed on the substrate 21 including surfaces of each of the plurality of driving electrodes COML. In the display region Ad, the plurality of pixel electrodes 22 are formed on the insulating film 24. Accordingly, the insulating film 24 electrically insulates the driving electrodes COML and the pixel electrodes 22.

As shown in FIG. 7, the plurality of pixel electrodes 22 are formed within each of the plurality of sub-pixels SPix arrayed in a matrix-like form in the X axis direction and the Y axis direction within the display region Ad when seen in a plan view. Accordingly, the plurality of pixel electrodes 22 are arrayed in a matrix-like form in the X axis direction and the Y axis direction.

In the example shown in FIG. 6, each of the plurality of driving electrodes COML is formed between the substrate 21 and the pixel electrodes 22. Further, as schematically shown in FIG. 7, each of the plurality of driving electrodes COML is provided to overlap the plurality of pixel electrodes 22 when seen in a plan view. Then, by applying voltage between each of the plurality of pixel electrodes 22 and each of the plurality of driving electrodes COML such that an electric field is formed between each of the plurality of pixel electrodes 22 and each of the plurality of driving electrodes COML, namely, at the liquid crystal elements LC provided in each of the plurality of sub-pixels SPix, an image is displayed in the display region Ad. At this time, a capacity Cap is formed between the driving electrodes COML and the pixel electrodes 22 and the capacity Cap functions as a retention volume.

The liquid crystal display device 20 as a display control unit controlling display of images is formed by the liquid crystal elements LC, the plurality of pixel electrodes 22, the driving electrodes COML, the plurality of scanning lines GCL and the plurality of signal lines SGL. The liquid crystal display device 20 as the display control unit controls display of images in the display region Ad by controlling voltage applied to between each of the plurality of pixel electrodes 22 and each of the plurality of driving electrodes COML. The liquid crystal display device 20 as the display control unit is provided between the substrate 21 and the substrate 31.

In this respect, each of the plurality of driving electrodes COML might also be formed on the opposite side of the substrate 21 with the pixel electrodes 22 being interposed therebetween. In the example shown in FIG. 6, the disposition of the driving electrodes COML and the pixel electrodes 22 is a disposition of a FFS (Fringe Field Switching) mode as a horizontal field mode in which the driving electrodes COML and the pixel electrodes 22 overlap when seen in a plan view. However, the disposition of the driving electrodes COML and the pixel electrodes 22 might also be a disposition of an IPS (In Plane Switching) mode as a horizontal field mode in which the driving electrodes COML and the pixel electrodes 22 do not overlap when seen in a plan view. Alternatively, the disposition of the driving electrodes COML and the pixel electrodes 22 might also be a disposition of a TN (Twisted Nematic) mode or VA (Vertical Alignment) mode as a vertical field mode.

The liquid crystal layer 6 is to demodulate light passing therethrough in accordance with states of the electric field, and a liquid crystal layer corresponding to the horizontal field mode such as the above-described FFS mode or the IPS mode is for example used. Namely, a liquid crystal device of the horizontal electric field mode such as the FFS mode or the IPS mode is used as the liquid crystal display device 20. Alternatively, it is also possible to use a liquid crystal display device of the vertical field mode such as the TN mode or the VA mode as described above. In this respect, there might be respectively provided alignment films between the liquid crystal layer 6 and the array substrate 2 and between the liquid crystal layer 6 and the opposing substrate 3 shown in FIG. 6.

As shown in FIG. 7, the plurality of sub-pixels SPix arrayed in the X axis direction, namely the plurality of sub-pixels SPix belonging to the same row of the liquid crystal display device 20 are connected with each other by means of the scanning lines GCL. The scanning lines GCL are connected with the gate driver 12 (see FIG. 1) and are supplied with scanning signals Vscan (see FIG. 1) by the gate driver 12. Further, the plurality of sub-pixels SPix arrayed in the Y axis direction, namely the plurality of sub-pixels SPix belonging to the same column of the liquid crystal display device 20 are connected with each other by means of the signal lines SGL. The signal lines SGL are connected with the source driver 13 (see FIG. 1) and are supplied with pixel signals Vpix (see FIG. 1) by the source driver 13. Moreover, the plurality of sub-pixels SPix arrayed in the X axis direction, namely the plurality of sub-pixels SPix belonging to the same row of the liquid crystal display device 20 are connected with each other by means of the driving electrodes COML.

The driving electrodes COML are connected with the driving electrode driver 14 (see FIG. 5) and are supplied with driving signals Vcom (see FIG. 1) by the driving electrode driver 14. That is, in the example shown in FIG. 7, the plurality of sub-pixels SPix which belong to the same row share one driving electrode COML in common. The plurality of driving electrodes COML respectively extend in the X axis direction and are arrayed in the Y axis direction in the display region Ad. As described above, since the plurality of scanning lines GCL respectively extend in the X axis direction and are arrayed in the Y axis direction in the display region Ad, the direction each of the plurality of driving electrodes COML extends is parallel to the direction each of the plurality of scanning lines GCL extends. However, the direction each of the plurality of driving electrodes COML extends is not limited, and the direction each of the plurality of driving electrodes COML extends might, for example, be a direction which is parallel to the direction each of the plurality of signal lines SGL extends.

The gate driver 12 as shown in FIG. 1 sequentially selects one row, namely one horizontal line, from among the sub-pixels SPix which are formed in a matrix-like form in the liquid crystal display device 20, as an object of display driving by applying scanning signals Vscan to the gate electrodes of the TFT elements Tr of each of the sub-pixels SPix by means of the scanning lines GCL shown in FIG. 7. The source driver 13 shown in FIG. 1 supplies pixel signals Vpix to each of the plurality of sub-pixels SPix which makes up one horizontal line sequentially selected by the gate driver 12 by means of the signal lines SGL shown in FIG. 7. Then, displays in accordance with supplied pixel signals Vpix are made at the plurality of sub-pixels SPix which makes up one horizontal line.

The driving electrode driver 14 shown in FIG. 1 applies driving signals Vcom to drive the driving electrodes COML for each drive range including one or a plurality of driving electrodes COML.

In the liquid crystal display device 20, sub-pixels SPix are sequentially selected in each horizontal line by driving the gate driver 12 to perform sequential scanning of the scanning lines GCL in a time-sharing manner. In the liquid crystal display device 20, the source driver 13 supplies pixel signals Vpix to the sub-pixels SPix which belong to one horizontal line, so that displays are made in each horizontal line. In performing these display operations, the driving electrode driver 14 applies driving signals Vcom to the driving electrodes COML included in the drive range corresponding to the one horizontal line.

The driving electrodes COML in the display 1 according to the first embodiment operate as driving electrodes of the liquid crystal display device 20 and also operate as driving electrodes of the touch detection device 30. FIG. 8 is a perspective view showing one configuration example of the driving electrodes and the detection electrodes of the display according to the first embodiment.

The touch detection device 30 includes a plurality of driving electrodes COML which are provided on the array substrate 2 and a plurality of detection electrodes TDL which are provided on the opposing substrate 3. Each of the plurality of detection electrodes TDL extends in the direction which intersects with the direction each of the plurality of driving electrodes COML extends when seen in a plan view. In other words, each of the plurality of detection electrodes TDL is provided to intersect with each of the plurality of driving electrodes COML at intervals with each other when seen in a plan view. Further, each of the plurality of detection electrodes TDL opposes each of the driving electrodes COML in a direction perpendicular to the upper surface of the substrate 21 included in the array substrate 2.

In other words, each of the plurality of driving electrodes COML overlaps with the group of pixels SPixG (see FIG. 7) when seen in a plan view. Further, each of the plurality of detection electrodes TDL overlaps with the group of pixels SPixG (see FIG. 7) when seen in a plan view.

Each of the plurality of detection electrodes TDL is respectively connected with the touch detection signal amplifying unit 42 (see FIG. 1) of the touch detection unit 40. Electrostatic capacities are generated at intersecting portions of each of the plurality of driving electrodes COML and each of the plurality of detection electrodes TDL when seen in a plan view. Input positions are detected based on the electrostatic capacities between each of the plurality of driving electrodes COML and each of the plurality of detection electrodes TDL. Namely, the touch detection unit 40 detects input positions based on the electrostatic capacities between the plurality of driving electrodes COML and the plurality of detection electrodes TDL.

With such a configuration, when performing touch detection operations in the touch detection device 30, the driver electrode driver 14 (see FIG. 1) sequentially selects, for example, one or a plurality of driving electrodes COML. Then, a driving signal Vcomt is supplied and input to the selected one or plurality of driving electrodes COML, and detection signals Vdet for detecting an input position are generated and output from the detection electrodes TDL. In this manner, in the touch detection device 30, touch detection is performed for each drive range in which the selected one or plurality of driving electrodes COML is/are included. The one or plurality of driving electrodes COML included in one drive range correspond(s) to the driving electrodes E1 of the above-described touch detection principle, and the detection electrodes TDL correspond to the detection electrodes E2.

As shown in FIG. 8, the plurality of driving electrodes COML and the plurality of detection electrodes TDL which intersect with each other when seen in a plan view form an electrostatic capacity type touch sensor arrayed in a matrix-like form. Thus, by scanning the entire touch detection surface of the touch detection device 30, it is possible to detect a position contacted or approached by a finger.

As shown in FIG. 5 and FIG. 6, the opposing substrate 3 includes the substrate 31, a color filter 32, the detection electrodes TDL and a polarizing plate 35. The color filter 32 is formed on the lower surface of the substrate 31. The detection electrodes TDL are detection electrodes of the touch detection device 30 and are formed on the upper surface of the substrate 31 as the other main surface thereof. The polarizing plate 35 is provided on the detection electrodes TDL.

For example, a color filter colored in three colors of red (R), green (G) and blue (B) is arrayed in the X axis direction as the color filter 32. Thus, as shown in FIG. 7, a plurality of sub-pixels SPix corresponding to each of color regions 32R, 32G and 32B of the three colors of R, G and B are formed, and one pixel Pix is formed by the plurality of sub-pixels SPix corresponding to each of a single group of the color regions 32R, 32G and 32B. The pixels Pix are arrayed in a matrix-like form along the direction the scanning lines GCL extend (X axis direction) and the direction the signal lines SGL extend (Y axis direction). The region in which the pixels Pix are arrayed in a matrix-like form is, for example, the above-described display region Ad.

The combination of colors of the color filter 32 might be another combination of a plurality of colors including colors other than R, G and B. It is also possible to provide no color filter 32 at all. Alternatively, one pixel Pix might include a sub-pixel SPix which is not provided with the color filter 32, that is, a white-colored sub-pixel SPix.

Scanning Operations

Scanning operations will now be explained with reference to FIG. 1, FIG. 9 and FIG. 10.

Figure 9:
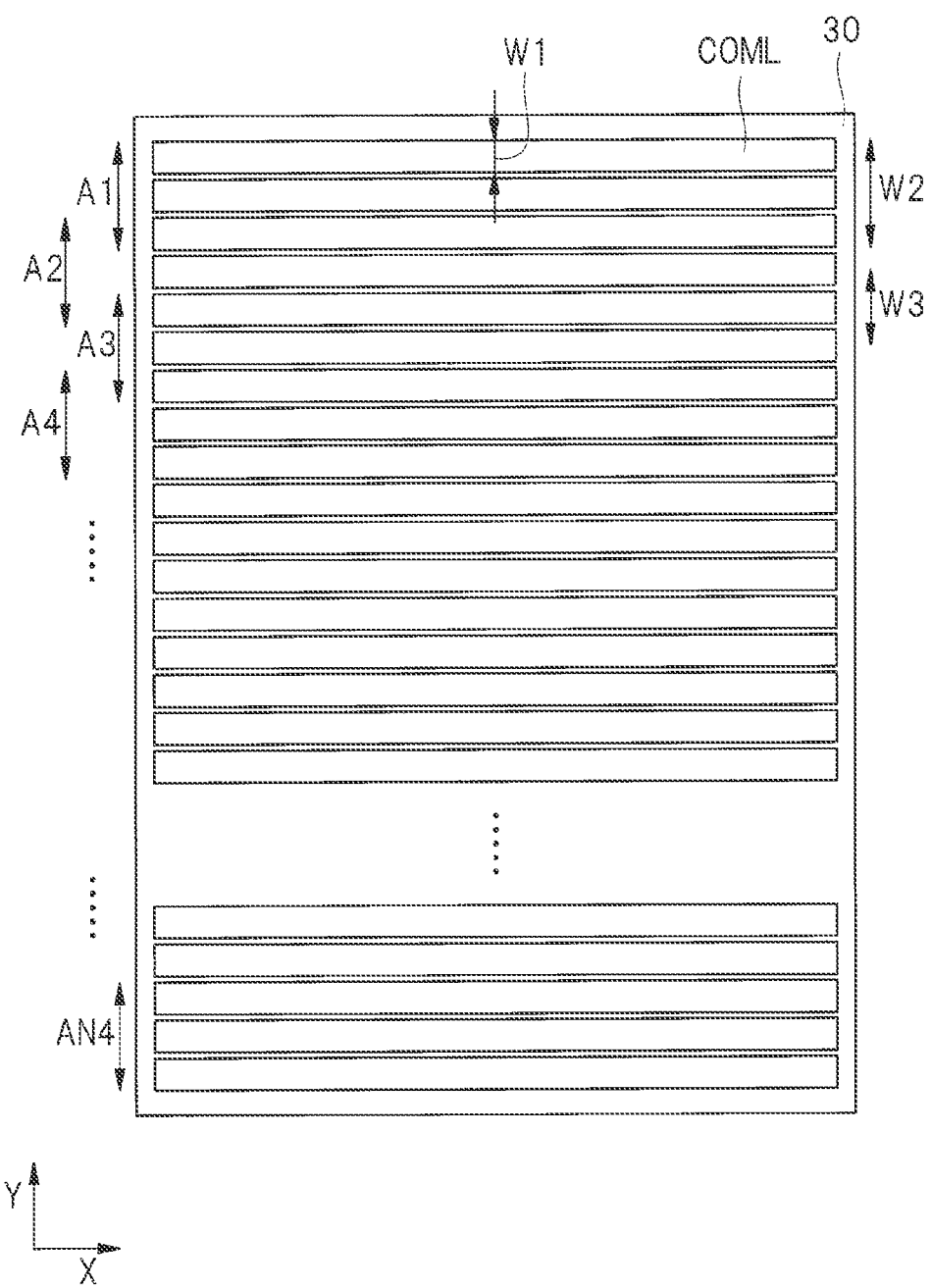
FIG. 9 is a plan view showing a disposition of driving electrodes in the display according to the first embodiment.

FIG. 9 is a plan view showing a disposition of driving electrodes in the display according to the first embodiment.

As shown in FIG. 9, the driving electrodes COML are of the same width and are arrayed in parallel. The driving electrode driver 14 simultaneously drives N2 (N2≥2) number of driving electrodes COML (for example, drive range A1). In the touch detection device 30, driving signals Vcomt supplied to the N2 number of driving electrodes COML are transmitted to the detection electrodes TDL through electrostatic capacity and are output as detection signals Vdet. Namely, a region corresponding to the N2 number of driving electrodes COML (for example, drive range A1) will be the touch detection region of the touch detection surface at this time, and the width of the region (touch detection width W2) is equal to the width of the N2 number of driving electrodes COML.

In this respect, the width of the respective driving electrodes COML in the Y axis direction is defined to be width W1 in FIG. 9.

The driving electrode driver 14 performs scanning operations in which the driving electrodes COML are scanned in a time-sharing manner in the order of drive ranges A1, A2, A3, A4 . . . AN4. In the respective scanning operations, N2 (N2≥2) number of driving electrodes COML disposed successively in the Y axis direction are selected and driving signals are supplied to each of the selected N2 number of driving electrodes COML. Scanning operations are repeated a plurality of times by shifting each of the selected N2 number of driving electrodes COML N3 numbers by N3 numbers (N3≥2) to the negative side in the Y axis direction. The number N3 is less than the number N2.

In the following description, a case in which the number N2 is 3 and the number N3 is 2 as shown in FIG. 9 will be explained. However, the number N2 is not limited to 3 and the number N3 is not limited to 2. Accordingly, the number N2 might be 5 while the number N3 might be 4.

In the example shown in FIG. 9, the driving electrode driver 14 selects the driving electrodes COML three by three (touch detection width W2), and each of the selected three driving electrodes COML is shifted by shifting them two by two (scanning pitch W3). The scanning pitch W3 is set by the number of driving electrodes COML of a portion at which mutually adjoining drive ranges (for example, drive range A1 and drive range A2) overlap. The touch detection width W2 can be set by the number of driving electrodes COML in the respective drive ranges.

The scanning pitch W3 is interrelated with the position resolution when detecting touch positions. Namely, in general, the position resolution can be made higher when the scanning pitch W3 is made small. On the other hand, the touch detection width W2 is interrelated with the detection sensitivity with respect to touch. In general, the detection sensitivity can be made higher when the touch detection width W2 is made small. The reason for this is that by increasing the touch detection width W2, the number of electric lines of force from the driving electrodes COML related to the touch detection width W2 increases in accordance with an area of the touch detection width W2.

In the first embodiment, since the scanning pitch W3 and the touch detection width W2 can be set independently, it is possible to independently set the position resolution when detecting touch positions and the detection sensitivity with respect to touch.

For example, when the position resolution shall be made higher while maintaining the detection sensitivity, the scanning pitch W3 shall be made small while maintaining the touch detection width W2. On the other hand, when the detection sensitivity shall be made higher while maintaining the position resolution, the touch detection width W2 shall be made large while maintaining the scanning pitch W3. Further, for example, when both of the position resolution and the detection sensitivity shall be made higher, the touch detection width W2 shall be made large and the scanning pitch W3 shall be made small.

Figure 10:
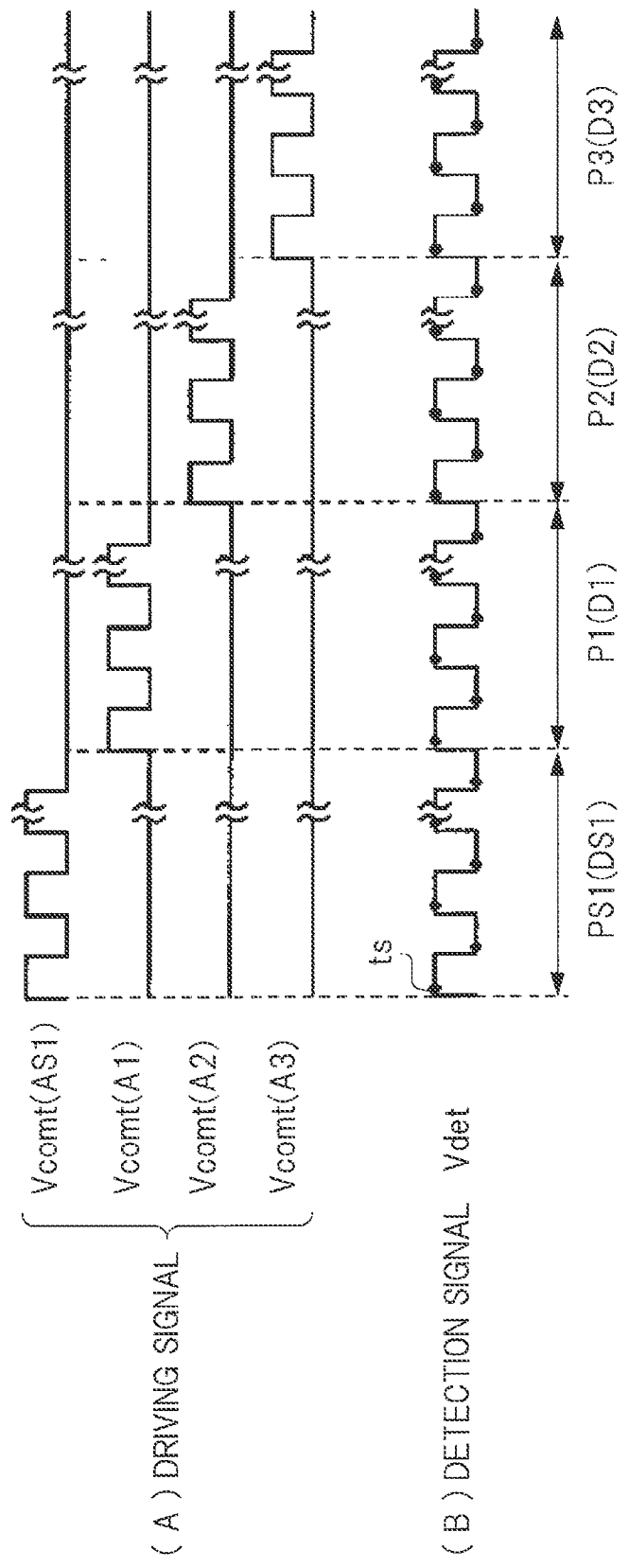
FIG. 10 is a diagram showing an example of timing waveforms of driving signals and detection signals in the display according to the first embodiment.

FIG. 10 is a diagram showing an example of timing waveforms of driving signals and detection signals in the display according to the first embodiment. FIG. 10A shows waveforms of driving signals Vcomt and FIG. 10B shows waveforms of detection signals Vdet.

The driving electrode driver 14 applies driving signals Vcomt including a plurality of pulse waveforms to the driving electrodes COML by each drive range in a time-sharing manner (FIG. 10A). The touch detection device 30 outputs signals based on the driving signals Vcomt as detection signals Vdet (FIG. 10B). The touch detecting unit 40 individually analyses the detection signals Vdet of respective drive ranges to detect presence/absence of touch and touch positions. Portions not applied with rectangular waves, namely pulse waveforms, are preferably applied with a constant potential to fix the potential. The potential to be fixed might be the ground potential or a potential different from the ground potential.

More particularly, during period P1, the driver electrode driver 14 applies driving signals Vcomt including a plurality of pulse waveforms to the driving electrodes COML included in the drive range A1 (Vcomt (A1) of FIG. 10A). In the touch detection device 30, the driving signals Vcomt are transmitted to the detection electrodes TDL via the electrostatic capacity between the driving electrodes COML related to the drive range A1 and the detection electrodes TDL to change the detection signals Vdet (FIG. 10B). The A/D conversion unit 43 of the touch detection unit 40 samples output signals of the analog LPF unit 42 to which the detection signals Vdet are input at sampling timings is corresponding to transitions of the plurality of pulse waveforms of the driving signals Vcomt (FIG. 10B) and performs A/D conversion. Based on the plurality of results of A/D conversion, the signal processing unit 44 determines presence/absence of touch in the region corresponding to drive range A1.

Also during period P2 and following periods, the touch detection device 30 performs touch detection similarly to period P1. Namely, during period P2, for example, the driving electrode driver 14 applies driving signals Vcomt to the driving electrodes COML included in the drive range A2 (Vcomt (A2) of FIG. 10A). In the touch detection device 30, the driving signals Vcomt are transmitted to the detection electrodes TDL via the electrostatic capacity between the driving electrodes COML included in the drive range A2 and the detection electrodes TDL to change the detection signals Vdet (FIG. 10B). The A/D conversion unit 43 and the signal processing unit 44 determine presence/absence of touch in the region corresponding to drive range A2 based on the detection signals Vdet.

In this manner, by performing the above-described operations for all surfaces of the touch detection surface, the signal processing unit 44 individually determines presence/absence of touch in regions corresponding to the respective drive ranges. Based on the touch detection results of all of the drive ranges, the coordinate extracting unit 45 of the touch detection unit 40 performs, for example, interpolating operations by a weighting average or the like for a plurality of regions (positions) at which touch has been detected to detect the touch positions.

In the touch detection device 30, the driving electrode driver 14 supplies driving signals Vcomt including a plurality of pulse waveforms to the driving electrodes COML for the respective drive ranges. The analog LPF unit 42, the A/D conversion unit 43 and the signal processing unit 44 of the touch detection unit 40 detect touch in the regions corresponding to the drive ranges based on the detection signals Vdet output from the detection electrodes TDL. Namely, the touch detection unit 40 detects touch based on a plurality of sampling results in regions corresponding to the respective drive ranges. Thus, it is possible to perform, for example, an adding average of a plurality of data or to statistically analyze sampling results by using a low pass filter such as a FIR, and degradations of S/N ratios due to irregularities in sampling results can be limited to the minimum.

In the touch detection device 30, the driving electrode driver 14 applies driving signals Vcomt including a plurality of pulse waveforms to the driving electrodes COML by each region corresponding to a single drive range, and the analog LPF unit 42, the A/D conversion unit 43 and the signal processing unit 44 of the touch detection unit 40 detects touch by each region. It is also possible to perform averaging processes of data detected upon driving a plurality of times for each drive range using analog circuit portions such as a low pass filter, or to perform averaging processes after A/D conversion.

In the first embodiment, intensities of driving signals Vcomt which are included in a single driving range and supplied to the plurality of driving electrodes COML disposed successively in the Y axis direction are equal. Thus, it is possible to simplify scanning operations.

The total number of driving electrodes COML in the touch detection device 30 is defined to be N1, the number of driving electrodes COML included in a single drive range is defined to be N2 as described above, and the number by which the driving electrodes COML selected for each scanning operation are shifted is defined to be N3. In this case, it is preferable that N1=N3×n+(N2−N3) is satisfied where n is a natural number. Thus, no number of driving electrodes COML less than N3 will be left after performing the last scanning operation of the scanning operations which are repeated a plurality of times, so that excess calculations can be omitted, and the algorithm for calculating input positions can be simplified.

As shown in FIG. 10, in the first embodiment, prior to performing scanning of the driving electrodes COML in a time-sharing manner in the order of drive range A1, A2 and A3, during period PS1 the driving electrode driver 14 supplies driving signals to the driving electrode COML at the starting edge of an array comprised of a plurality of driving electrodes COML in the drive range AS1. Though not shown in FIG. 10, after scanning the driving electrodes COML in a time-sharing manner, the driving electrode drive 14 supplies driving signals to the driving electrodes COML at the terminal edge of the array comprised of a plurality of driving electrodes COML during period PE1 (see FIG. 11 to be described later) in drive range AE1 (see FIG. 11 to be described later). Details of scanning operations performed during period PS1 and period PE1 will be explained using FIG. 11 to be described later.

Overall Scanning Operations Including Scanning Operations at Starting Edges and Terminal Edges Next, overall scanning operations including scanning operations at starting edges and terminal edges will be explained with reference to FIG. 1 and FIG. 11 to FIG. 13.

Figure 11:
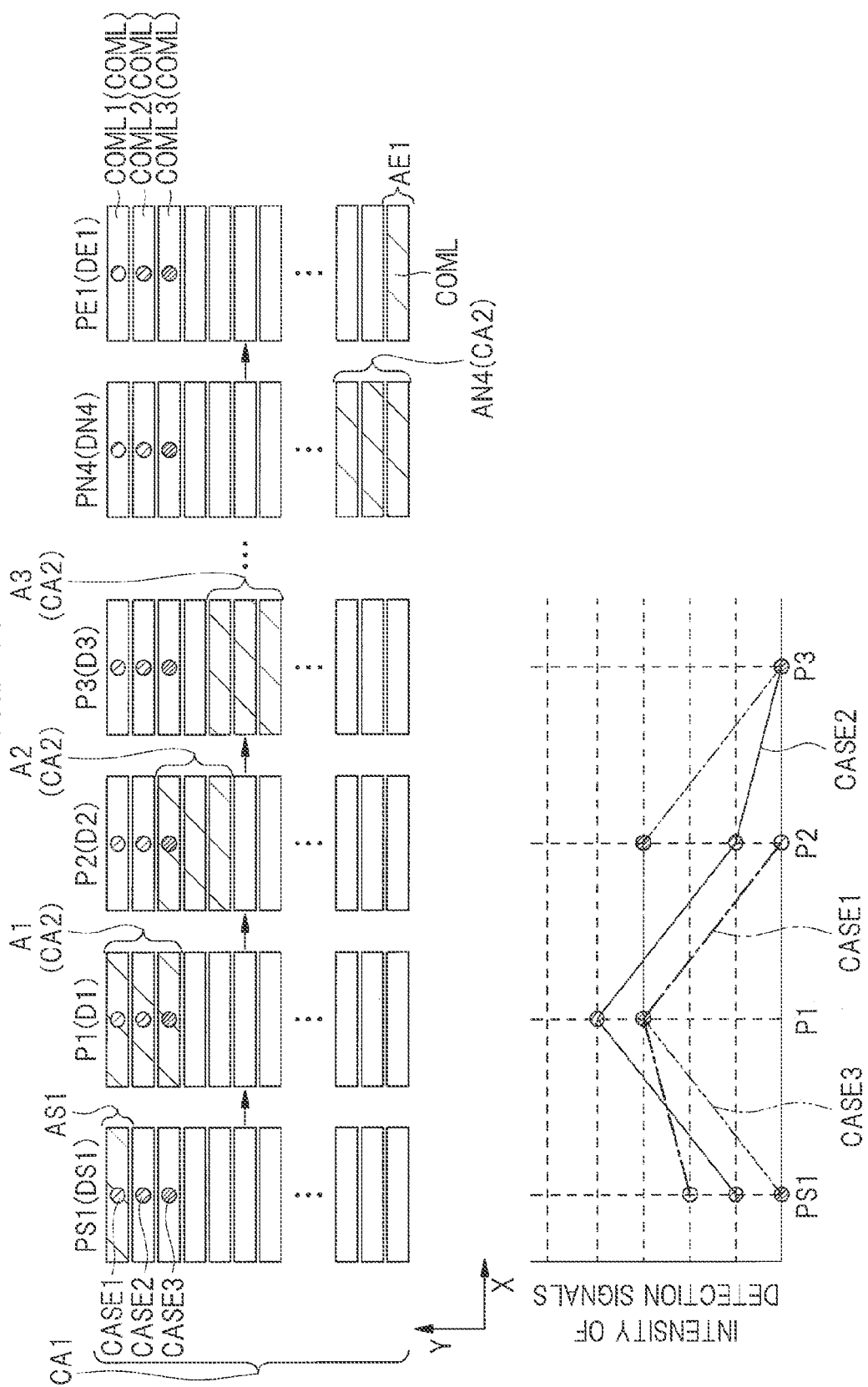
FIG. 11 is a diagram showing an operation example of scanning operations in the display according to the first embodiment.

FIG. 11 is a diagram showing an operation example of scanning operations in the display according to the first embodiment. In FIG. 11, in each of the periods P51, P1, P2, P3, PN4 and PE1, selected driving electrodes COML from among the plurality of driving electrodes COML are indicated by hatchings. Further, in FIG. 11, when an input tool has contacted or approached each of the three driving electrodes COML1, COML2 and COML3 included in the drive range A1, intensities of detection signals during each of the periods PS1, P1, P2 and P3 are shown schematically as a graph.

In this respect, in the present description, the phrase an input tool "has contacted or approached", for example, driving electrodes" indicates that the input tool has contacted or approached a detection surface on a touch panel of portions positioned on the driving electrodes.

As described above, during scanning operations, the driving electrode driver 14 scans the driving electrodes COML at touch detection width W2 (see FIG. 9) and scanning pitch W3 (see FIG. 9). In the example shown in FIG. 11, the driving electrode driver 14 selects the driving electrodes COML three by three (touch detection width W2), and each of the selected three driving electrodes COML is scanned by respectively shifting them two by two (scanning pitch W3).

As shown in FIG. 11, during period PS1, the driving electrode driver 14 performs scanning operations (scanning operations at starting edge) DS1 for supplying driving signals to the driving electrode COML1 which is the driving electrode on the outermost side in the drive range A1. More particularly, during period PS1, the driving electrode driver 14 performs scanning operations DS1 for supplying driving signals to the driving electrode COML1 disposed at the end portion on the positive side in the Y axis direction of the array CA1 comprised of a plurality of driving electrodes COML. The drive range AS1 of the scanning operations DS1 is comprised of driving electrodes COML1.

The intensity of detection signals during period PS1 is the strongest when the input tool has contacted or approached the driving electrode COML1 (CASE 1), the second strongest when the input tool has contacted or approached the driving electrode COML2 (CASE 2) and the weakest and substantially equal to zero when the input tool has contacted or approached the driving electrode COML3 (CASE 3).

Next, the driving electrode driver 14 scans the driving electrodes COML in a time-sharing manner in the order of drive range A1, A2, A3, . . . AN4 (N4≥2). More particularly, the driving electrode driver 14 performs scanning operations D1, D2, D3, . . . DN4 (N4≥2). In each of the scanning operations, three driving electrodes COML disposed successively in the Y axis direction are selected from among the plurality of driving electrodes COML. Then, driving signals are supplied to driving electrodes COML included in array CA2 comprised of the selected three driving electrodes COML. Further, the driving electrode driver 14 repeats the scanning operations for N4 (N4≥2) number of times, that is, a plurality of times, by shifting each of the selected three driving electrodes COML two by two in a direction opposite to the positive side in the Y axis direction, that is, to the negative side.

At this time, during the respective scanning operations, driving signals having mutually equal intensities are supplied to all of the driving electrodes COML included in the array CA2 comprised of the selected three driving electrodes COML.

When the input tool has contacted or approached the driving electrode COML1 (CASE 1), the intensity of the detection signals during period P1 increases more than the intensity of the detection signals during period PS1 and the intensity of the detection signals during period P2 reduces to substantially zero. When the input tool has contacted or approached the driving electrode COML2 (CASE 2), the intensity of the detection signals during period P1 increases more than the intensity of the detection signals during period PS1, the intensities of the detection signals gradually reduce in the order of period P1, P2 and P3 and the intensity of the detection signals during period P3 reduces to substantially zero. When the input tool has contacted or approached the driving electrode COML3 (CASE 3), the intensity of the detection signals during period P1 increases more than the intensity of the detection signals during period PS1, the intensity of the detection signals during period P2 is substantially equal to the intensity of the detection signals during period P1, and the intensity of the detection signals during period P3 reduces to substantially zero.

In the example shown in FIG. 11, since the scanning pitch W3 (see FIG. 9) is smaller than the touch detection width W2 (see FIG. 9), it is possible to make the intensity of the detection signals strong even when the input tool has contacted or approached the driving electrodes COML which are disposed at end portions in the scanning direction (Y axis direction) of the array CA2 comprised of driving electrodes COML included in the drive range.

Further, in the example shown in FIG. 11, since driving signals are supplied to the driving electrode COML1 in the drive range AS1 which is smaller than the drive range A1 during period PS1, it is possible to improve the position resolution when detecting touch positions in the periphery of the starting edge of the array CA1 comprised of a plurality of driving electrodes COML, and to improve the detection sensitivity with respect to touch.

Thereafter, during period PE1, the driving electrode driver 14 performs scanning operations (scanning operations at terminal edge) DE1 for supplying driving signals to the driving electrode COML on the outermost side in the drive range AN4 (N4≥2). More particularly, during period PE1, the driving electrode driver 14 performs scanning operations DE1 for supplying driving signals to the driving electrode COML disposed at the end portion on the negative side in the Y axis direction of the array CA1 comprised of a plurality of driving electrodes COML. The drive range AE1 of scanning operations DE1 is comprised of a driving electrode COML disposed at the end portion on the negative side in the Y axis direction of the array CA1.

In the example shown in FIG. 11, since driving signals are supplied to a driving electrode COML in the drive range AE1 which is smaller than the drive range AN4 during period PE1, it is possible to improve the position resolution when detecting touch positions in the periphery of terminal edge of the array CA1 comprised of a plurality of driving electrodes COML, and to improve the detection sensitivity with respect to touch.

Figure 12:
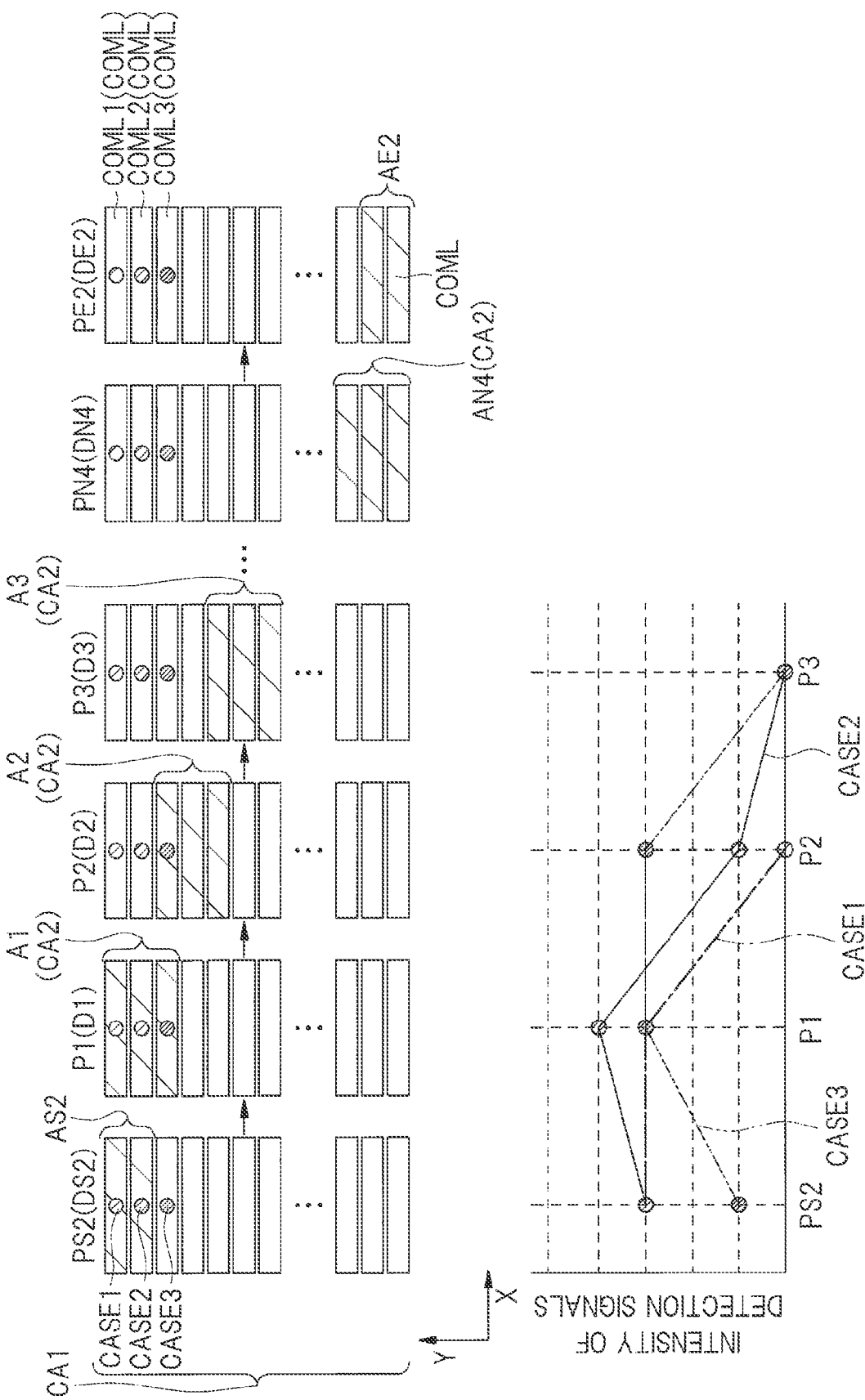
FIG. 12 is a diagram showing another operation example of scanning operations in the display according to the first embodiment.

FIG. 12 is a diagram showing other operation examples of scanning operations in the display according to the first embodiment. In FIG. 12, in each of the periods PS2, P1, P2, P3, PN4 and PE2, selected driving electrodes COML from among the plurality of driving electrodes COML are indicated by hatchings. Further, in FIG. 12, when an input tool has contacted or approached each of the three driving electrodes COML1, COML2 and COML3 included in the drive range A1, intensities of detection signals during each of the periods PS2, P1, P2 and P3 are shown schematically as a graph.

As shown in FIG. 12, during period PS2, the driving electrode driver 14 performs scanning operation (scanning operations at starting edges) DS2 for supplying driving signals to the driving electrodes COML1 and COML2 which are the two driving electrodes on the outermost side in the drive range A1. More particularly, during period PS2, the driving electrode driver 14 performs scanning operations D2 for supplying driving signals to the driving electrodes COML1 and COML2 disposed at the end portion on the positive side in the Y axis direction of the array CA1 comprised of a plurality of driving electrodes COML. The drive range A2 of the scanning operations DS2 is comprised of driving electrodes COML1 and COML2.

Namely, during scanning operations DS2 at the starting edge, the driving electrode driver 14 supplies driving signals to each of the NS number (two or more) of driving electrodes COML, which are disposed successively in the Y axis direction, including the driving electrode COML1. The number NS is less than the number N2 of driving electrodes COML selected in each of the scanning operations D1, D2, D3, . . . DN4 (N4≥2).

The intensity of detection signals during period PS2 is the strongest and mutually equal when the input tool has contacted or approached the driving electrode COML1 (CASE 1) and when the input tool has contacted or approached the driving electrode COML2 (CASE 2), and is the weakest when the input tool has contacted or approached the driving electrode COML3 (CASE 3).

Then, the driving electrode driver 14 scans the driving electrodes COML in a time-sharing manner in the order of drive range A1, A2, A3, . . . AN4 (N4≥2). More particularly, the driving electrode driver 14 performs scanning operations D1, D2, D3, . . . DN4 (N4≥2). In each of the scanning operations, three driving electrodes COML disposed successively in the Y axis direction are selected from among the plurality of driving electrodes COML. Then, driving signals are supplied to driving electrodes COML included in array CA2 comprised of the selected three driving electrodes COML. Further, the driving electrode driver 14 repeats the scanning operations for N4 (N4≥2) number of times, that is, a plurality of times by shifting each of the selected three driving electrodes COML two by two to the opposite side of the positive side in the Y axis direction, that is, to the negative side.

When the input tool has contacted or approached the driving electrode COML1 (CASE 1), the intensity of detection signals during period P1 is substantially equal to the intensity of detection signals during period P2 and the intensity of detection signals during period P2 reduces to approximately zero. When the input tool has contacted or approached the driving electrode COML2 (CASE 2), the intensity of detection signals during period P1 increases more than the intensity of the detection signals during period PS2, the intensities of the detection signals gradually reduce in the order of period P1, P2 and P3 and the intensity of the detection signals during period P3 reduces to substantially zero. When the input tool has contacted or approached the driving electrode COML3 (CASE 3), the intensity of the detection signals during period P1 increases more than the intensity of the detection signals during period PS2, the intensity of the detection signals during period P2 is substantially equal to the intensity of the detection signals during period P1, and the intensity of the detection signals during period P3 reduces to substantially zero.

Also in the example shown in FIG. 12, as in the example shown in FIG. 11, since the scanning pitch W3 (see FIG. 9) is smaller than the touch detection width W2 (see FIG. 9), it is possible to make the intensity of the detection signals strong even when the input tool has contacted or approached the driving electrodes COML disposed at the end portion in the scanning direction (Y axis direction) of the array CA2.

Further, in the example shown in FIG. 12, during period PS2, driving signals are supplied to the driving electrodes COML1 and COML2 in the drive range AS2 which is smaller than the drive range A1. Thus, it is possible to improve the position resolution when detecting touch positions in the periphery of the starting edge of the array CA1 comprised of a plurality of driving electrodes COML, and to improve the detection sensitivity with respect to touch.

Thereafter, the driving electrode driver 14 performs scanning operations (scanning operations at terminal edge) DE2 for supplying driving signals to the two driving electrodes COML on the outermost side during period PE2 in the drive range AN4 (N4≥2). More particularly, during period PE2, the driving electrode driver 14 performs scanning operations DE2 for supplying driving signals to each of the two driving electrodes COML disposed at the end portion on the negative side in the Y axis direction of the array CA1 comprised of a plurality of driving electrodes COML. The drive range AE2 of scanning operations DE2 is comprised of two driving electrodes COML disposed at the end portion on the negative side in the Y axis direction of the array CA1.

Namely, during scanning operations DE2 at the terminal edge, the driving electrode driver 14 supplies driving signals to each of the NE number (two or more) of driving electrodes COML, which are disposed successively in the Y axis direction, including the driving electrodes COML disposed at the end portion on the negative side in the Y axis direction of the array CA1. The number NE is less than the number N2.

By performing scanning operations DE2 at the terminal edge, driving signals are supplied to each of the two driving electrodes COML during period PE2 in the drive range AE2 which is smaller than the drive range AN4. Thus, it is possible to improve the position resolution when detecting touch positions in the periphery of the terminal edge of the array CA1 comprised of a plurality of driving electrodes COML, and to improve the detection sensitivity with respect to touch.

Figure 13:
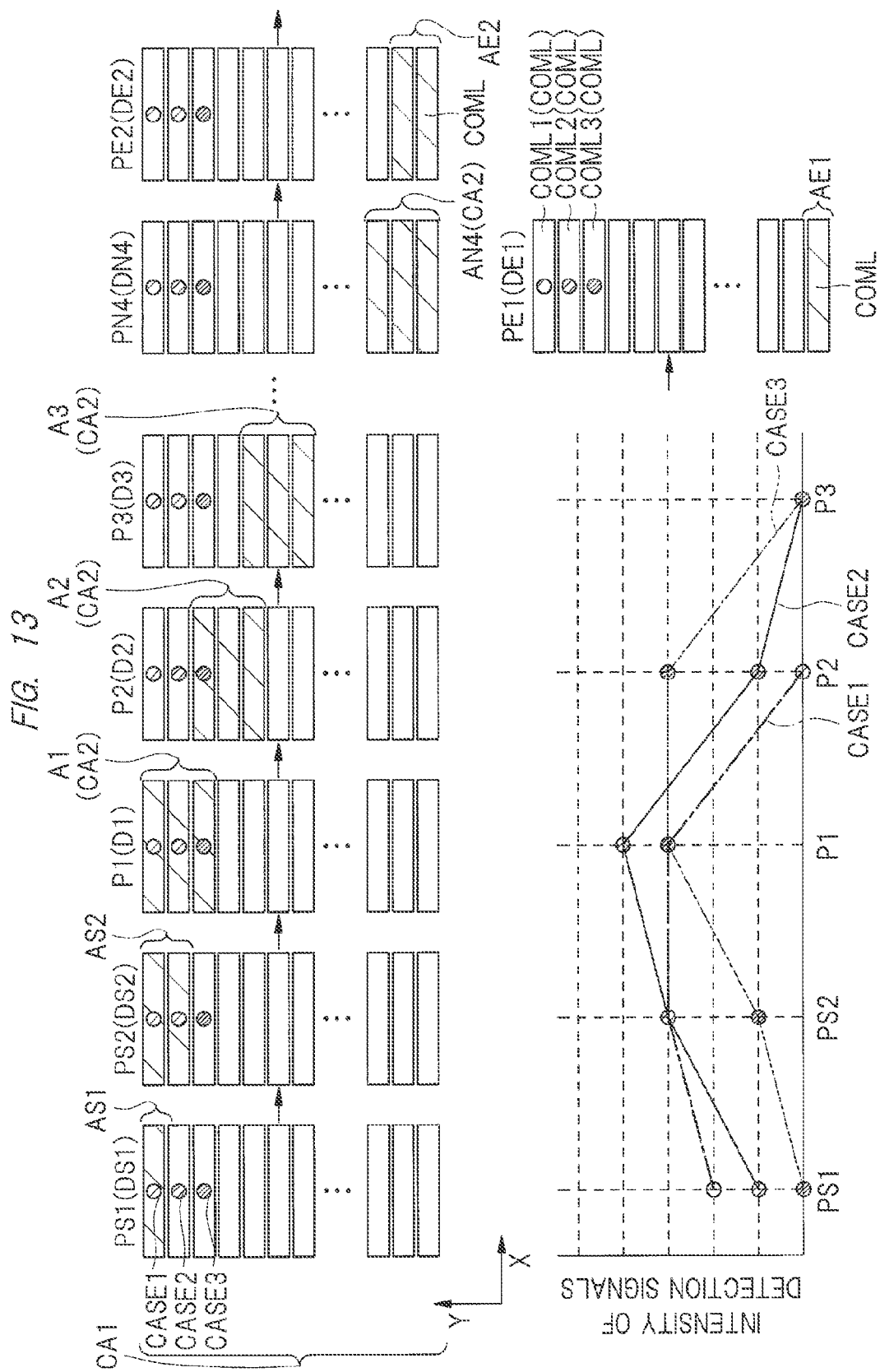
FIG. 13 is a diagram showing still another operation example of scanning operations in the display according to the first embodiment.

FIG. 13 is a diagram showing still other operation examples of scanning operations in the display according to the first embodiment. In FIG. 13, in each of the periods PS1, PS2, P1, P2, P3, PN4, PE2 and PE1, selected driving electrodes COML from among the plurality of driving electrodes COML are indicated by hatchings. Further, in FIG. 13, when an input tool has contacted or approached each of the three driving electrodes COML1, COML2 and COML3 included in the drive range A1, intensities of detection signals during each of the periods PS1, PS2, P1, P2 and P3 are shown schematically as a graph.

As shown in FIG. 13, during period PS1, the driving electrode driver 14 performs scanning operations (scanning operations at the starting edge) DS1 for supplying driving signals to the driving electrode COML1 which is the driving electrode on the outermost side in the drive range A1. Next, during period PS2, the driving electrode driver 14 performs scanning operations (scanning operations at starting edge) DS2 for supplying driving signals to the driving electrodes COML1 and COML2 which are the two driving electrodes on the outermost side in the drive range A1. Then, the driving electrode driver 14 scans the driving electrodes COML in a time-sharing manner in the order of drive range A1, A2, A3, . . . AN4 (N4≥2).

Namely, during scanning operations DS2 at the starting edge, the driving electrode driver 14 supplies driving signals to each of the NS number (two or more) of driving electrodes COML, which are disposed successively in the Y axis direction, including the driving electrode COML1. The number NS is less than the number N2.

When the input tool has contacted or approached the driving electrode COML1 (CASE 1), the intensity of detection signals during period PS2 increases more than the intensity of the detection signals during period PS1, the intensity of detection signals during period P1 is substantially equal to the intensity of detection signals during period PS2, and the intensity of the detection signals during period P2 reduces to substantially zero. When the input tool has contacted or approached the driving electrode COML2 (CASE 2), the intensities of the detection signals gradually increase in the order of period PS1, PS2 and P1, the intensities of the detection signals gradually reduce in the order of period P1, P2 and P3, and the intensity of detection signals during period P3 reduces to substantially zero. When the input tool has contacted or approached the driving electrode COML3 (CASE 3), the intensity of the detection signals during period PS1 is substantially zero, the intensities of the detection signals gradually increase in the order of period P51, PS2 and P1, the intensity of the detection signals during period P2 is substantially equal to the intensity of the detection signals during period P1, and the intensity of the detection signals during period P3 reduces to substantially zero.

Also in the example shown in FIG. 13, by performing scanning operations D1, D2, D3, . . . DN4, it is possible to make the intensity of detection signals strong even when an input tool has contacted or approached the driving electrodes COML disposed at end portions in the scanning direction (Y axis direction) of the array CA2 comprised of driving electrodes COML included in the drive ranges. Also in the example shown in FIG. 13, by performing the scanning operations DS1 and DS2 at the starting edge, it is possible to improve the position resolution when detecting touch positions in the periphery of the starting edge of the array CA1 comprised of a plurality of driving electrodes COML, and to improve the detection sensitivity with respect to touch.

Thereafter, during period PE2, the driving electrode driver 14 performs scanning operations (scanning operations at terminal edge) DE2 for supplying driving signals to the two driving electrodes on the outermost side in drive range AN4 (N4≥2). Next, during period PE1, the driving electrode driver 14 performs scanning operations (scanning operations at terminal edge) DE1 for supplying driving signals to the driving electrode COML on the outermost side in drive range AN4.

Namely, during scanning operations DE2 at the terminal edge, the driving electrode driver 14 supplies driving signals to each of the NE number (two or more) of driving electrodes COML, which are disposed successively in the Y axial direction, including the driving electrode COML disposed at the end portion on the negative side in the Y axis direction of array CA1. The number NE is less than the number N2.

Also in the example shown in FIG. 13, by performing scanning operations DE1 and DE2 at the terminal edge, it is possible to improve the position resolution when detecting touch positions in the periphery of the terminal edge of the array CA1 comprised of a plurality of driving electrodes COML, and to improve the detection sensitivity with respect to touch during periods PE2 and PE1.

Intensities of Detection Signals at End Portions of Drive Ranges

Next, intensities of detection signals when an input tool has contacted or approached end portions of drive ranges will be explained in comparison to Comparative Example 1.

Figure 14:
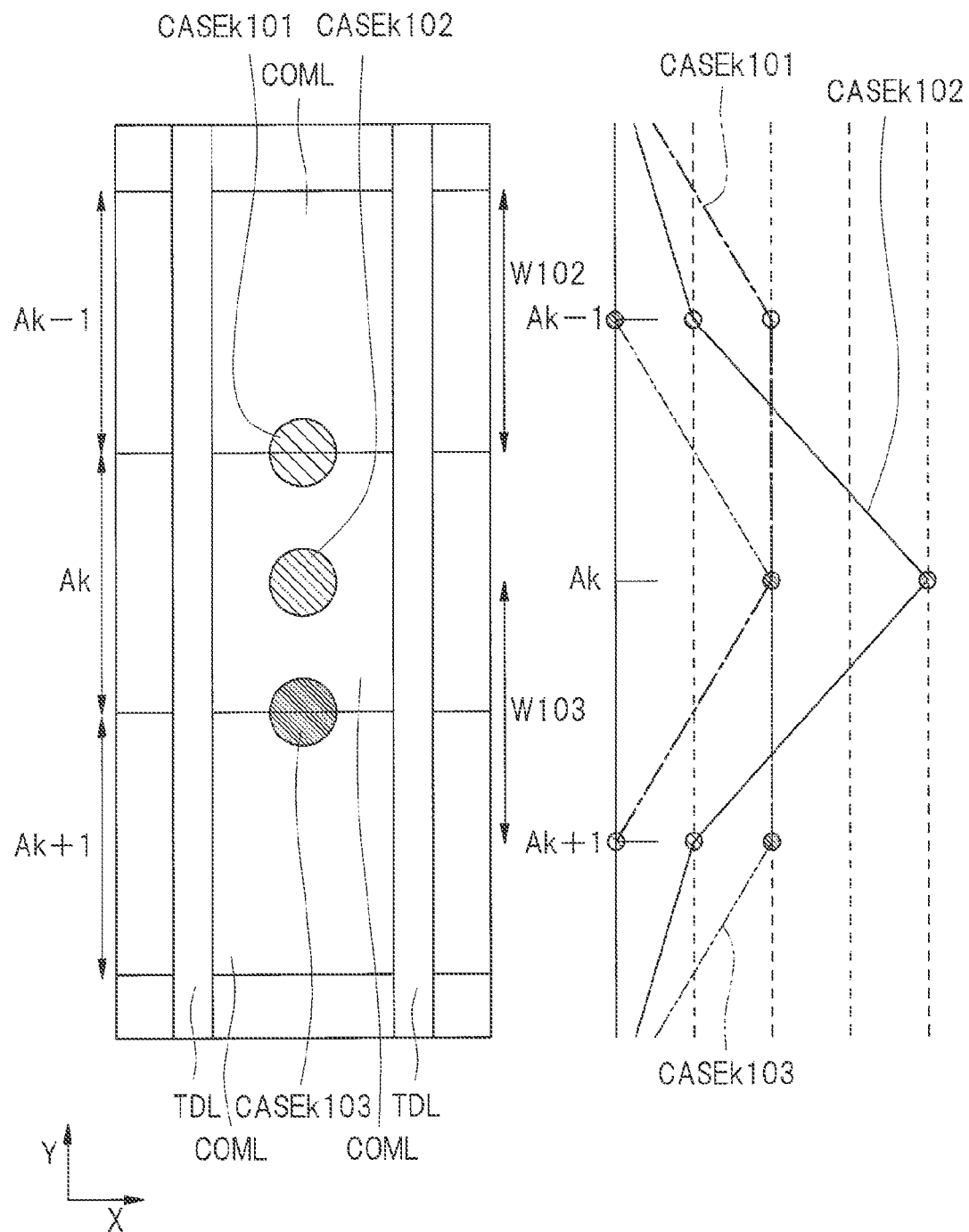
FIG. 14 is a diagram showing scanning operations in a display according to Comparative Example 1 in enlarged form.
Figure 15:
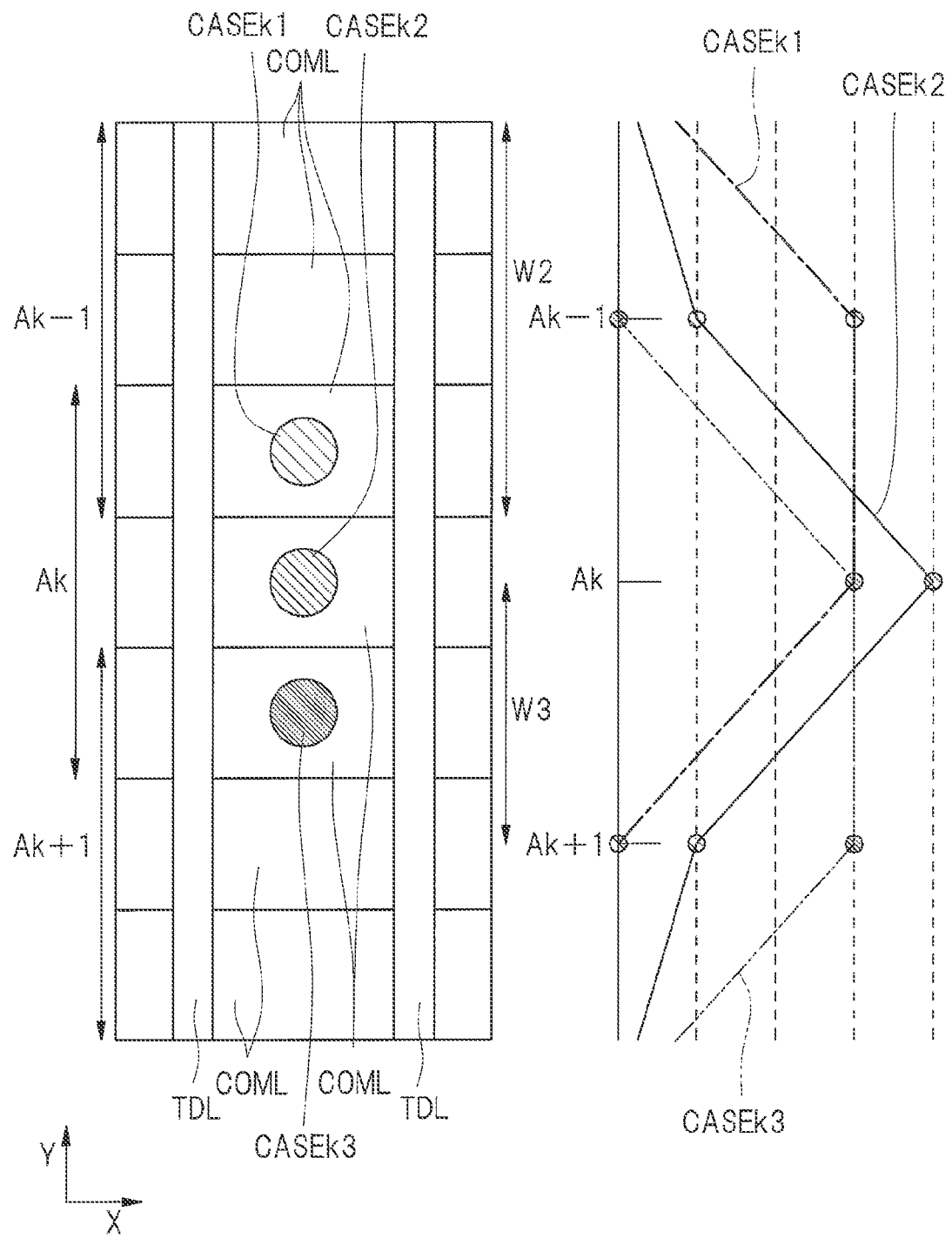
FIG. 15 is a diagram showing scanning operations in a display according to the first embodiment in enlarged form.

FIG. 14 is a diagram showing scanning operations in a display according to Comparative Example 1 in enlarged form. FIG. 15 is a diagram showing scanning operations in a display according to the first embodiment in enlarged form. FIG. 14 and FIG. 15 show driving electrodes COML included in three drive ranges, namely a drive range Ak (where k is a natural number larger than 1 and less than N4) and the drive ranges Ak−1 and Ak+1 preceding and following this drive range Ak.

In FIG. 14, intensities of detection signals in each of the drive ranges Ak−1, Ak and Ak+1 are shown schematically as a graph when an input tool has contacted or approached a boundary portion between the drive range Ak−1 and the drive range Ak, the central portion of drive range Ak and a boundary portion between the drive range Ak and the drive range Ak+1.

As shown in FIG. 14, in Comparative Example 1, the two adjoining drive ranges do not overlap each other. Therefore, when an input tool has contacted or approached a boundary portion of a certain drive range, the input tool will contact or approach the boundary portion of a drive range adjoining to this certain drive range. Further, the width of the drive range in the Y axis direction (touch detection width W102) is defined to be 4 mm while the pitch (scanning pitch W103) is defined to be 4 mm in Comparative Example 1. The position resolution of an input position detected in Comparative Example 1 will be a position resolution corresponding to the pitch of 4 mm.

As shown in FIG. 14, in Comparative Example 1, when the input tool has contacted or approached a boundary portion between the drive range Ak−1 and drive range Ak (CASE k101), the intensity of detection signals in the drive range Ak+1 is substantially zero, while the intensity of detection signals in the drive range Ak−1 and the intensity of detection signals in the drive range Ak are substantially equal but not very strong. When the input tool has contacted or approached the central portion of the drive range Ak (CASE k102), the intensity of detection signals in the drive range Ak is stronger than the intensities of detection signals in both of the drive ranges Ak−1 and Ak+1, and the intensity of detection signals in the drive range Ak−1 and the intensity of detection signals in the drive range Ak+1 are substantially equal. When the input tool has contacted or approached the drive range Ak+1 (CASE k103), the intensity of detection signals in the drive range Ak−1 is substantially zero, while the intensity of detection signals in the drive range Ak and the intensity of detection signals in the drive range Ak+1 are substantially equal but not very strong.

Here, when the input tool has contacted or approached a boundary portion between the drive range Ak−1 and the drive range Ak (CASE k101), the intensities of detection signals in both of the drive range Ak−1 and the drive range Ak are weak. When the input tool has contacted or approached a boundary portion between the drive range Ak and the drive range Ak+1 (CASE k103), the intensities of detection signals in both of the drive range Ak and the drive range Ak+1 are weak. Accordingly, when the input tool has contacted or approached a boundary portion of the certain drive range, the detection sensitivity is reduced, and as a result, the position resolution of the detected input position is reduced.

When the input tool is, for example, a tip of a thin stylus pen or a finger wearing a glove, detection signals will become small even when the input tool has contacted or approached the central portion of the drive range. In such a case, the problems of reductions in detection sensitivity and reductions in position resolution when the input tool has contacted or approached the above-described boundaries of drive ranges will become remarkable.

Further, as shown in FIG. 14, when the position contacted or approached by the input tool is a boundary portion of two adjoining drive ranges and positioned intermediate of two adjoining detection electrodes TDL, the intensity of the detection signals will become even weaker, so that the above-described problems of reductions in detection sensitivity and reductions in position resolution will become more remarkable.

On the other hand, as shown in FIG. 15, the two adjoining drive ranges overlap each other in the first embodiment. Therefore, even when an input tool has contacted or approached a boundary portion of the certain drive range, the input tool will contact or approach a portion closer to the central portion side than the boundary portion of a drive range adjoining to the certain drive range. Further, the width of the drive range in the Y axis direction (touch detection width W2) is defined to be 6 mm while the pitch (scanning pitch W3) of the drive range is defined to be 4 mm in the first embodiment. In this case, the position resolution of an input position detected in the first embodiment will be a position resolution corresponding to the pitch of 4 mm, and corresponds to the position resolution of an input position detected in Comparative Example 1.

In FIG. 15, intensities of detection signals at each of the drive ranges Ak−1, Ak and Ak+1 when an input tool has contacted or approached a driving electrode COML common between the drive range Ak−1 and the drive range Ak, the central portion of the drive range Ak, and a driving electrode COML common between the drive range Ak and the drive range AK+1 are schematically shown as a graph.

In the first embodiment, when an input tool has contacted or approached a driving electrode COML common between the drive range Ak−1 and the drive range Ak (CASE k1), the intensity of detection signals in the drive range Ak+1 is substantially zero and the intensities of detection signals in the drive ranges Ak−1 and Ak are substantially equal and stronger than those of Comparative Example 1. When an input tool has contacted or approached the central portion of the drive range Ak (CASE k2), the intensity of detection signals in drive range Ak is stronger than the intensities of detection signals in both of the drive ranges Ak−1 and Ak+1, and the intensity of detection signals in the drive range Ak−1 and the intensity of detection signals in the drive range Ak+1 are substantially equal. When an input tool has contacted or approached a driving electrode COML common between the drive range Ak and the drive range Ak+1 (CASE k3), the intensity of detection signals in the drive range Ak−1 is substantially zero, and the intensity of detection signals in the drive range Ak and the intensity of detection signals in the drive range Ak+1 are substantially equal and stronger than that of Comparative Example 1.

Accordingly, in the first embodiment, it is possible to improve the detection sensitivity even when an input tool has contacted or approached boundaries of drive ranges, and as a result, it is possible to improve the position resolution of the detected input positions.

Even when the input tool is, for example, a tip of a thin stylus pen or a finger wearing a glove and the input tool has contacted or approached any portion of the drive ranges, it is possible to improve the detection sensitivity and the position resolution.

Also, as shown in FIG. 15, when the position contacted or approached by the input tool is positioned intermediate of two adjoining detection electrodes TDL, it is possible to make the intensity of detection signals strong and to improve the detection sensitivity and the position resolution.

Suppose that the intensity of detection signals is represented by a ratio in a case where the intensity of detection signals when a column having a diameter of 9 mm and comprised of a conductive material is used as an input tool is given as 100%. In such a case, when the position contacted or approached by the input tool is a boundary portion of drive ranges and is positioned intermediate of two adjoining detection electrodes TDL, the intensity of detection signals which is 8% in Comparative Example 1 increases by 2.7 times to 25% in the first embodiment. In this respect, even when the position contacted or approached by the input tool is a central portion of a drive range and positioned on a detection electrode TDL, due to the different numbers of driving electrodes included in the drive ranges, the intensity of detection signals which is 20% in Comparative Example 1 increases by 2.0 times to 40% in the first embodiment whereas this magnification of 2.0 times is smaller than the above-described magnification of 2.7 times. Accordingly, it is apparent that the display of the first embodiment has the effect of improving the detection sensitivity when an input tool has contacted or approached boundary portions of drive ranges.

Scanning Operations at Starting Edges and Terminal Edges

Next, scanning operations at starting edges and terminal edges will be explained in comparison to Comparative Example 2.

FIG. 16 is a diagram showing an operation example of scanning operations in a display according to Comparative Example 2. In FIG. 16, in each of the periods P1, P2, P3 and PN4, selected driving electrodes COML from among the plurality of driving electrodes COML are indicated by hatchings. Further, in FIG. 16, when an input tool has contacted or approached each of the three driving electrodes COML1, COML2 and COML3 included in the drive range A1, intensities of detection signals during each of the periods P1, P2 and P3 are shown schematically as a graph.

As shown in FIG. 16, in Comparative Example 2, the driving electrode driver 14 scans the driving electrodes COML in a time-sharing manner in the order of drive range A1, A2, A3, . . . AN4 (N4≥2). More particularly, the driving electrode driver 14 performs scanning operations D1, D2, D3, . . . DN4 (N4≥2). Namely, scanning operations are repeated for a several times as in the case explained using FIG. 11.

When the input tool has contacted or approached the driving electrode COML1 (CASE 101), the intensity of detection signals during period P2 will reduce to be lower than the intensity of detection signals during period P1 and becomes substantially zero. When the input tool has contacted or approached the driving electrode COML2 (CASE 102), the intensities of detection signals gradually reduce in the order of period P1, P2 and P3 and the intensity of detection signals during period P3 becomes substantially zero. When the input tool has contacted or approached the driving electrode COML3 (CASE 103), the intensity of detection signals during period P2 is substantially equal to the intensity of detection signals during period P1, and the intensity of detection signals during period P3 becomes substantially zero.

In Comparative Example 2, when the input tool has contacted or approached the driving electrode COML1 (CASE 101), the period during which detection signals having an intensity of a certain strength are detected is limited to period P1. Namely, the number of scanning operations in which the driving electrode COML1 is included is less than the number of scanning operations in which a driving electrode COML disposed at the central portion of the array CA1 is included. Accordingly, since there will be less pieces of information when obtaining the input position through calculation, the sensitivity and position resolution when the input tool has contacted or approached the driving electrode COML1 (CASE 101) will be reduced in comparison with, for example, when the input tool has contacted or approached a driving electrode COML disposed closer to the central portion side of the array CA1 than the driving electrode COML2.

Alternatively, in Comparative Example 2, when the input tool has contacted or approached the driving electrode COML2 (CASE 102), the period during which detection signals having an intensity of certain strength are detected is limited to period P1. Namely, the number of scanning operations in which the driving electrode COML2 is included is less than the number of scanning operations in which a driving electrode COML disposed at the central portion of the array CA1 is included. Accordingly, since there will be less pieces of information when obtaining the input position through calculation, the sensitivity and position resolution when the input tool has contacted or approached the driving electrode COML2 (CASE 102) will be reduced in comparison with, for example, when the input tool has contacted or approached a driving electrode COML disposed closer to the central portion side of the array CA1 than the driving electrode COML2.

On the other hand, in the first embodiment, it is possible to perform scanning operations DS1 at the starting edge as explained using FIG. 11. When the input tool has contacted or approached the driving electrodes COML1 (CASE 1), detection signals having an intensity of certain strength are detected not only during period P1 but also during period PS1. Thus, there will be more pieces of information when obtaining the input position through calculation, so that the sensitivity and position resolution when the input tool has contacted or approached the driving electrode COML1 (CASE 1) will improve similarly to, for example, when the input tool has contacted or approached a driving electrode COML disposed closer to the central portion side of the array CA1 than the driving electrode COML2.

Further, in the first embodiment, it is possible to perform scanning operations DS2 at the starting edge as explained using FIG. 12. When the input tool has contacted or approached the driving electrodes COML1 or COML2, detection signals having an intensity of certain strength are detected not only during period P1 but also during period P2. Thus, there will be more pieces of information when obtaining the input position through calculation, so that the sensitivity and position resolution when the input tool has contacted or approached the driving electrodes COML1 or COML2 will improve similarly to, for example, when the input tool has contacted or approached a driving electrode COML disposed closer to the central portion side of the array CA1 than the driving electrode COML2.

Namely, in the first embodiment, it is possible to improve the detection sensitivity and the position resolution even when an input tool has contacted or approached any one of boundaries of drive ranges and end portions of the display region Ad (see FIG. 5).

However, in the example explained using FIG. 12, the intensity of detection signals during period PS2 in which an input tool has contacted or approached the driving electrode COML2 (CASE 2) is substantially equal to the intensity of detection signals during period PS2 in which an input tool has contacted or approached the driving electrode COML1 (CASE 1). On the other hand, in the example explained using FIG. 11, the intensity of detection signals during period PS1 in which an input tool has contacted or approached the driving electrode COML2 (CASE 2) differs from the intensity of detection signals during period PS1 in which an input tool has contacted or approached the driving electrode COML1 (CASE 1). In this manner, differences in pieces of information will be larger when an input tool has contacted or approached each of the driving electrodes COML1, COML2 and COML3 by performing only scanning operations DS1 at the starting edge rather than performing only scanning operations DS2 at the starting edge, which is of advantage in improving the sensitivity and position resolution.

Moreover, in the example explained using FIG. 13, it is possible to perform both of scanning operations DS1 and DS2 at starting edges. Thus, there will be more pieces of information when obtaining the input position through calculation in comparison with cases in which only scanning operations DS1 at the starting edge are performed, so that the sensitivity and position resolution when the input tool has contacted or approached the driving electrodes COML1 and COML2 will further improve.

However, in the example explained using FIG. 13, since both of the scanning operations DS1 and DS2 at the starting edge are performed, the number of scanning operations is increased compared to any of the examples explained using FIG. 11 and examples explained using FIG. 12.

Method for Calculating Input Positions

Figure 17:
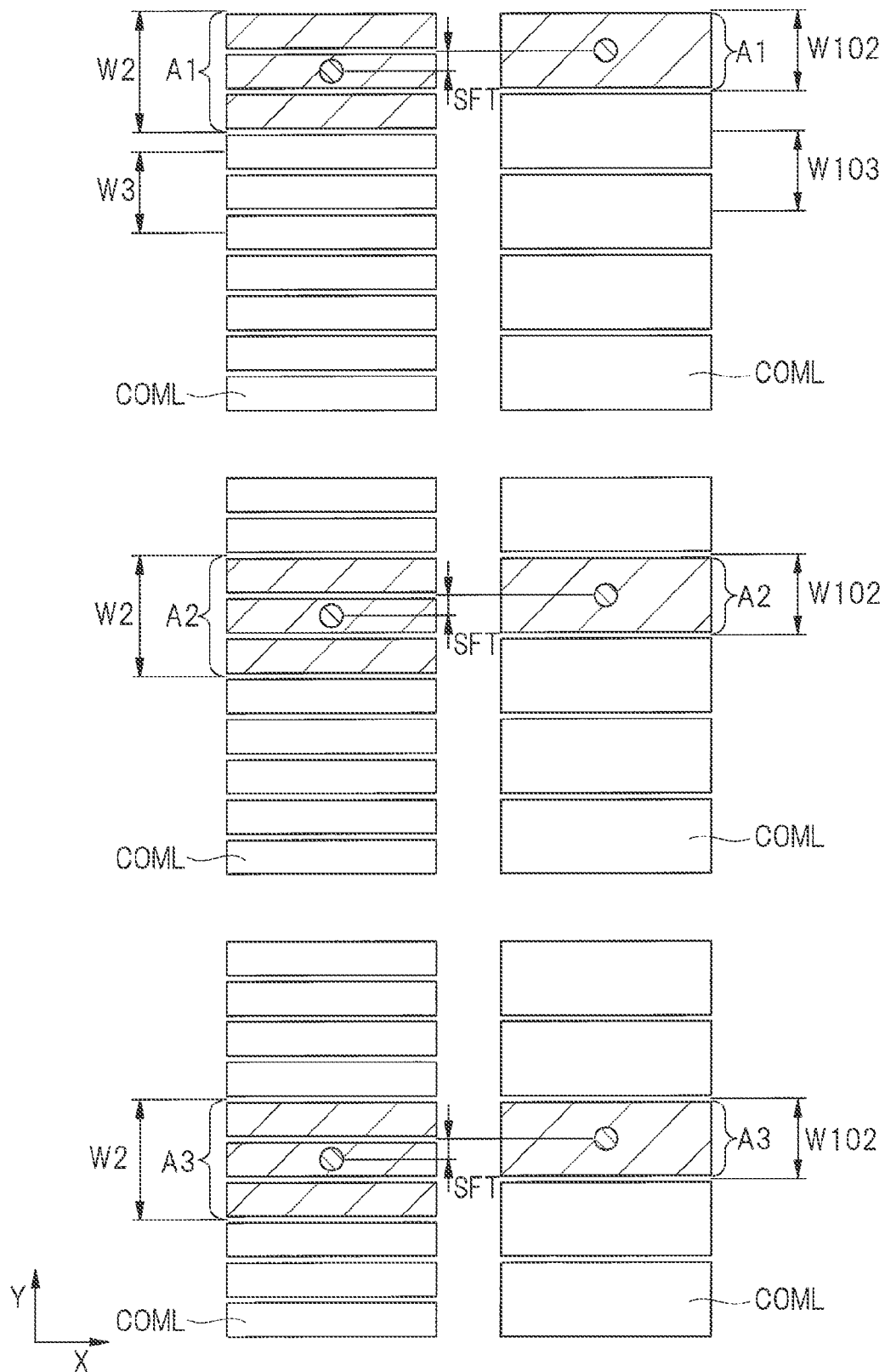
FIG. 17 is a diagram for explaining a method for calculating input positions in the display according to the first embodiment.

Next, a method for calculating input positions will be explained. FIG. 17 is a diagram for explaining a method for calculating input positions in the display according to the first embodiment. On the left side in FIG. 17, there are shown actual positions of an input tool when the input tool has contacted or approached at central portions of each of the drive ranges A1, A2 and A3 in the order from top to bottom. On the right side in FIG. 17, there are shown calculated positions of the input tool when the input tool has contacted or approached central portions of each of the drive ranges A1, A2 and A3 in the order from top to bottom.

In the first embodiment, two adjoining drive ranges overlap each other and the width of each of the drive ranges A1, A2 and A3 (touch detection width W2) is larger than the pitch (scanning pitch W3). In this case, it is possible to use a simple algorithm for calculating input positions when two adjoining drive ranges do not overlap as shown in FIG. 14 as Comparative Example 1, and both of the touch detection width W102 and the scanning pitch W103 are equal to the scanning pitch W3 in the first embodiment. Thus, even when adjoining drive ranges overlap each other as in the first embodiment, it is possible to calculate input positions using a simple algorithm when adjoining drive ranges do not overlap each other as in Comparative Example 1.

In the example shown in FIG. 17, the touch detection width W2 of each of the drive ranges A1, A2 and A3 is 6 mm, and the scanning pitch W3 is 4 mm. On the other hand, in the first embodiment, it is possible to use the algorithm for calculating input positions when the touch detection width W102 of the drive ranges A1, A2 and A3 is 4 mm and the scanning pitch W103 is 4 mm as in Comparative Example 1.

However, when using the method for calculating input positions according to Comparative Example 1 as the method for calculating input positions according to the first embodiment, the calculated positions are shifted in the Y axis direction which is the array direction of the array CA1 (see, for example, FIG. 11) comprised of driving electrodes COML with respect to actual positions as shown in FIG. 17. The amount of shift SFT is given as (W2−W3)/2 using the touch detection width W2 and the scanning pitch W3. In the example shown in FIG. 17, namely when the touch detection width W2 is 6 mm and the scanning pitch W3 is 4 mm, the amount of shift SFT is 1 mm.

Accordingly, in the first embodiment, it is possible to calculate, at a high position resolution, input positions using a simple algorithm when adjoining drive ranges do not overlap by simply adding an algorithm for correcting the amount of shift SFT.

Groups of Detection Electrodes

The display according to the first embodiment might favorably include groups of detection electrodes comprised of a plurality of detection electrodes for collectively detecting detection signals. Next, the groups of detection electrodes will be explained.

Figure 18:
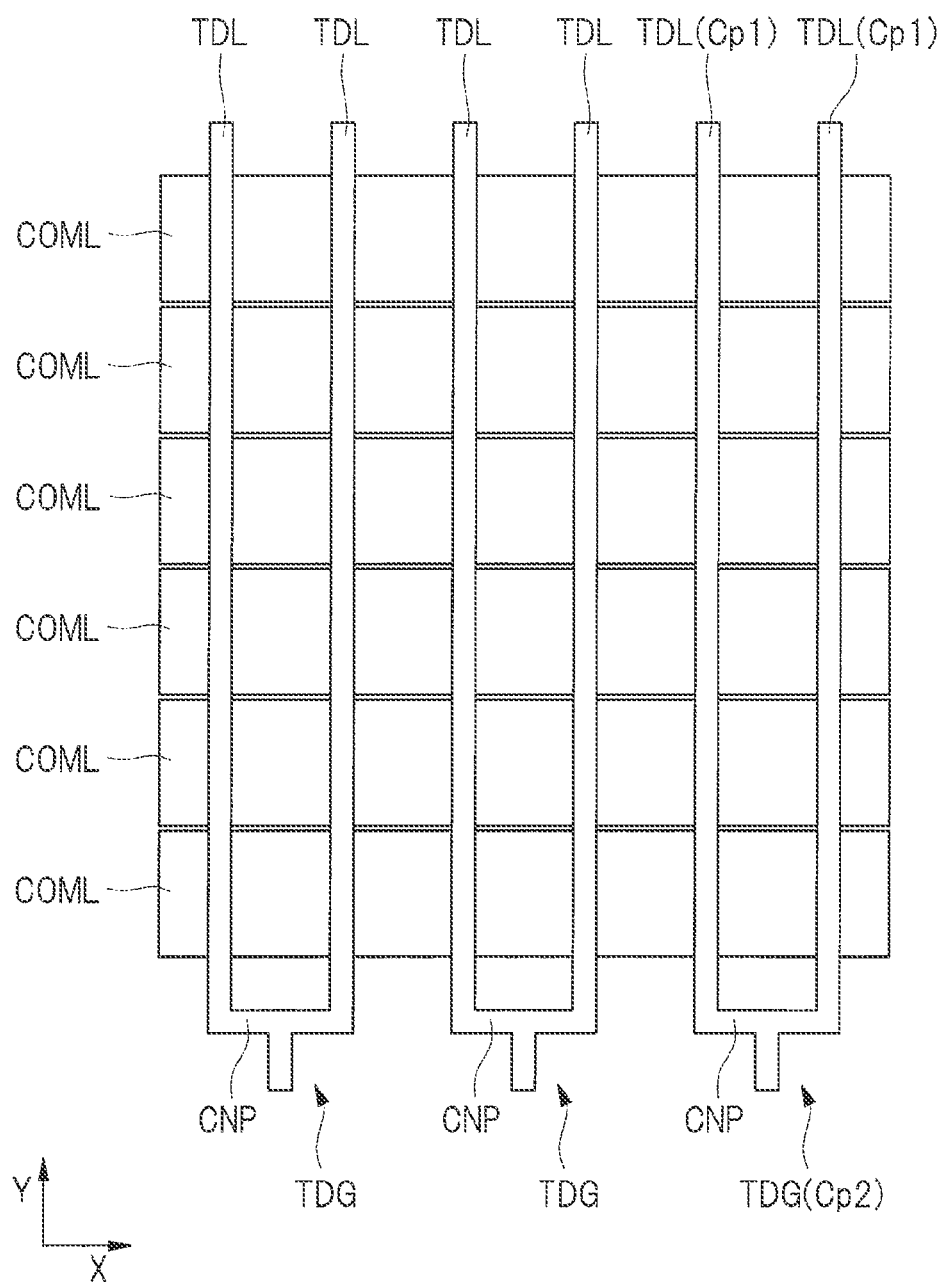
FIG. 18 is a plan view showing one example of detection electrodes according to the first embodiment.

FIG. 18 is a plan view showing one example of detection electrodes according to the first embodiment. In this respect, there are shown driving electrodes in addition to the detection electrodes in FIG. 18.

As shown in FIG. 18, each of the plurality of groups of detection electrodes TDG includes a plurality of detection electrodes TDL disposed successively in the X axis direction and connecting portions CNP. The connecting portions CNP included in each of the plurality of groups of detection electrodes TDG mutually connects end portions of each of the plurality of detection electrodes TDL, which are included in each of the plurality of groups of detection electrodes TDG, on the negative side in the Y axis direction. Each of the plurality of detection electrodes TDL included in each of the plurality of groups of detection electrodes TDG is connected to the touch detection unit 40 (see FIG. 1) via the connecting portions CNP.

In the example shown in FIG. 18, each of the plurality of groups of detection electrodes TDG includes two detection electrodes TDL disposed successively in the X axis direction.

At this time, the touch detection unit 40 (see FIG. 1) detects, for example, in each of the scanning operations, input positions based on electrostatic capacity Cp2 obtained by adding each of the electrostatic capacities Cp1 among each of the plurality of detection electrodes TDL included in the groups of detection electrodes TDG and the plurality of driving electrodes COML.

As shown in FIG. 15, the intensity of detection signals becomes weak when the position contacted or approached by the input tool is positioned intermediate of two adjoining detection electrodes TDL. On the other hand, as shown in FIG. 18, by including groups of detection electrodes TDG comprised of detection electrodes TDL which are disposed successively in the X axis direction and which are electrically connected to each other, it is possible to make the intensity of detection signals strong when the position contacted or approached by the input tool is positioned intermediate of two adjoining detection electrodes TDL. While two detection electrodes TDL are actually directly connected, namely, bundled in the example shown in FIG. 18, it is also possible to connect, namely bundle, two connection wirings respectively connected to each of the two detection electrodes TDL on a flexible substrate. Further, while two detection electrodes TDL are bundled as a single group of detection electrodes TDG in the example shown in FIG. 18, the same effects can be obtained by bundling three or more detection electrodes TDL.

Figure 19:
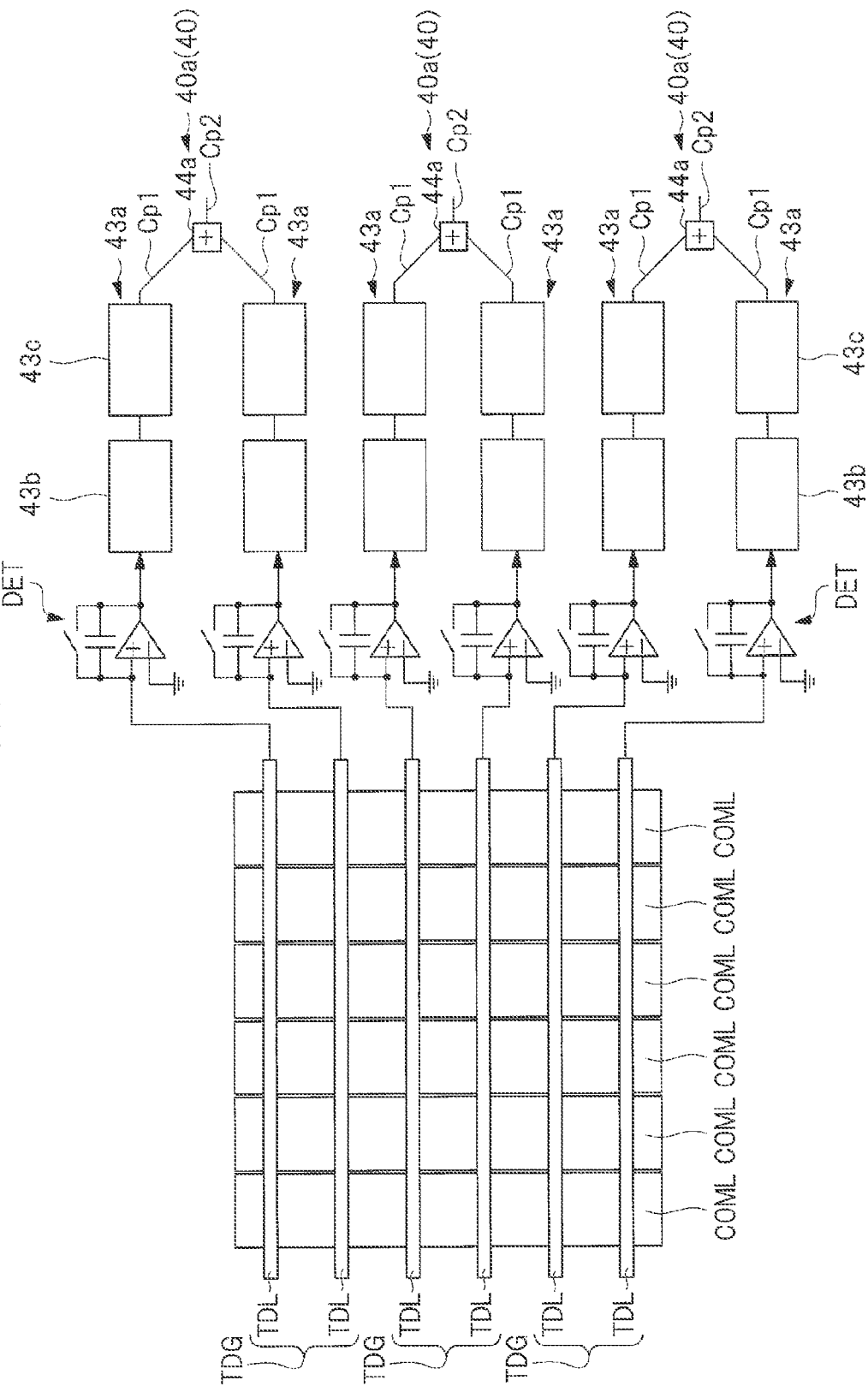
FIG. 19 is a plan view showing another example of detection electrodes according to the first embodiment.

FIG. 19 is a plan view showing another example of detection electrodes according to the first embodiment. In this respect, there are shown driving electrodes COML in addition to detection electrodes TDL in FIG. 19.

In the example shown in FIG. 19, the groups of detection electrodes TDG do not include the connecting portions CNP of FIG. 18. On the other hand, the touch detection unit 40 includes a plurality of touch detection units 40a respectively connected to each of the groups of detection electrodes TDG, and each of the plurality of touch detection units 40a includes a plurality of conversion units 43a and an adding unit 44a. The plurality of conversion units 43a are respectively connected to each of the plurality of detection electrodes TDL included in the groups of detection electrodes TDG, and respectively convert detection signals from each of the plurality of detection electrodes TDL included in the groups of detection electrodes TDG into electrostatic capacity Cp1. The adding units 44a are respectively connected to the plurality of conversion units 43a, and respectively add the respective electrostatic capacities Cp1 which have been converted in each of the plurality of conversion units 43a to obtain electrostatic capacity Cp2.

Each of the plurality of conversion units 43a includes a voltage detector DET similar to the voltage detector DET explained using FIG. 3, an analog sampling circuit 43b and an A/D conversion circuit 43c. Each of the plurality of detection electrodes TDL included in the groups of detection electrodes TDG is connected to the voltage detector DET while the voltage detector DET is connected to the analog sampling circuit 43b, and the analog sampling circuit 43b is connected to the A/D conversion circuit 43c. Then, the plurality of A/D conversion circuits 43c, which are respectively connected via each of the plurality of detection electrodes TDL included in each of the plurality of groups of detection electrodes TDG, each of the plurality of voltage detectors DET and each of the plurality of analog sampling circuits, are connected to a single adding unit 44a. The adding units 44a are included, for example, in the signal processing unit 44 (see FIG. 1).

The detection signals generated at the detection electrodes TDL are converted into voltage waveforms by means of the voltage detectors DET. The converted voltage waveforms are sampled as analog signals by means of the analog sampling circuits 43b, and the sampled analog signals are converted into digital signals by means of the A/D conversion circuits 43c as electrostatic capacities of the respective detection electrodes TDL. In this manner, by adding digital signals converted in the respective conversion units 43a in the adding unit 44a, an electrostatic capacity Cp2 is obtained by adding respective electrostatic capacities Cp1 of each of the plurality of detection electrodes TDL included in each of the plurality of groups of detection electrodes TDG.

Also in the example shown in FIG. 19, there are provided groups of detection electrodes TDG comprised of a plurality of detection electrodes TDL which are successively disposed and which are electrically connected to each other, as in the example shown in FIG. 18. Accordingly, it is possible to increase the intensity of detection signals when the position contacted or approached by the input tool is positioned intermediate of two adjoining detection electrodes TDL.

Second Embodiment

In the first embodiment, the intensities of driving signals supplied to a plurality of driving electrodes included in a single drive range and being disposed successively are equal to each other. In contrast thereto, in the second embodiment, the intensities of driving signals supplied to driving electrodes disposed at central portions of arrays comprised of a plurality of driving electrodes included in a single drive range and being disposed successively are smaller than the intensities of driving signals supplied to driving electrodes disposed at both end portions of the arrays, or zero.

Features of the display according to the second embodiment such as the overall configuration other than the scanning operations are similar to the features of the display according to the first embodiment, and explanations thereof will be omitted.

Scanning Operations

Next, scanning operations will be explained with reference to FIG. 1 and FIG. 20. In this respect, in the following description, the driving electrode driver 14 selects the driving electrodes COML three by three (touch detection width W2), and there will be explained a case where each of the selected three driving electrodes COML is scanned by shifting them two by two (scanning pitch W3). Further, in the following description, points different from those of the first embodiment will be mainly explained.

Figure 20:
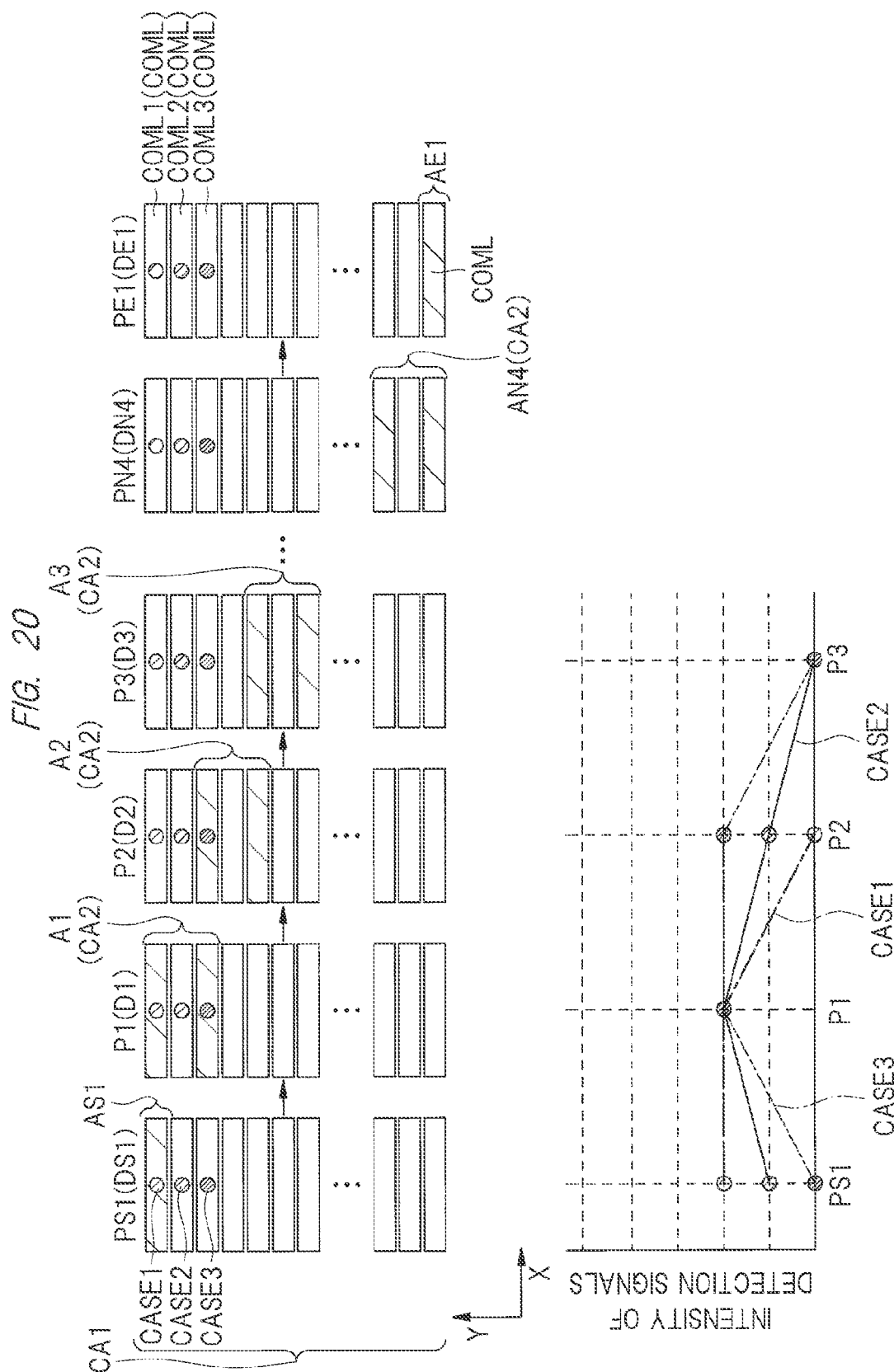
FIG. 20 is a diagram showing an operation example of scanning operations in a display according to a second embodiment.

FIG. 20 is a diagram showing an operation example of scanning operations in a display according to the second embodiment. In FIG. 20, in each of the periods PS1 and PE1, selected driving electrodes COML are indicated by hatchings, and in each of the periods P1, P2, P3 and PN4, driving electrodes COML disposed at both end portions of the array CA2 comprised of the selected driving electrodes COML are indicated by hatchings. Further, in FIG. 20, when an input tool has contacted or approached each of the three driving electrodes COML1, COML2 and COML3 included in the drive range A1, intensities of detection signals during each of the periods PS1, P1, P2 and P3 are shown schematically as a graph.

Figure 21:
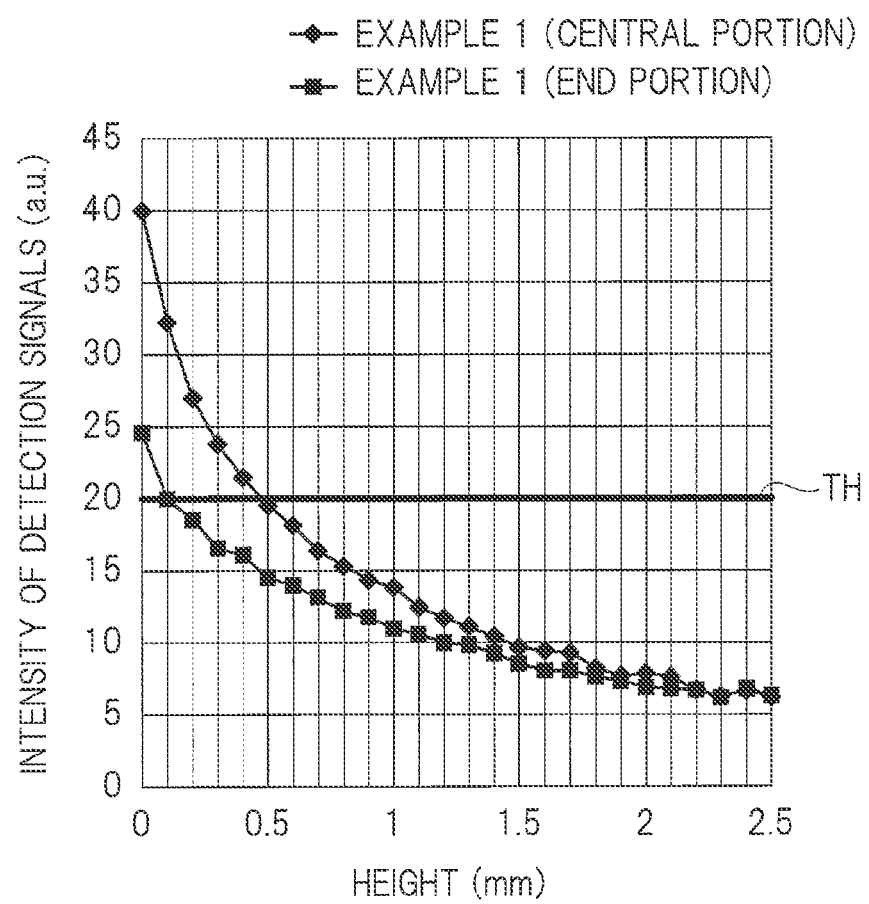
FIG. 21 is a graph showing a relationship of height of an input tool and intensity of detection signals when performing scanning operations of the first embodiment.

FIG. 21 is a graph showing a relationship of height of an input tool and intensity of detection signals when performing scanning operations of the first embodiment. The height of the input tool indicates a distance between a detection surface of the touch panel and a tip of the input tool in a direction vertical to the detection surface of the touch panel. Further, FIG. 21 shows cases in which the input tool is positioned on the driving electrodes COML disposed at the central portion of the array CA2 comprised of the selected plurality of driving electrodes COML in Example 1 as one example of the first embodiment (indicated as "Example 1 (central portion)). Further, FIG. 21 shows cases in which the input tool is positioned on the driving electrodes COML disposed at end portions of the array CA2 in Example 1 as one example of the first embodiment (indicated as "Example 1 (end portion)).

In this respect, the intensity of detection signals in FIG. 21 is represented by a ratio in a case where the intensity of detection signals when a column having a diameter 9 mm and comprised of a conductive material is used as an input tool is given as 100.

Also in the second embodiment as in the first embodiment explained using FIG. 9, the driving electrode driver 14 scans the driving electrodes COML at touch detection width W2 and scanning pitch W3 in scanning operations. In the example shown in FIG. 21, the driving electrode driver 14 selects the driving electrodes COML there by three (touch detection width W2), and each of the selected three driving electrodes COML is scanned by shifting them two by two (scanning pitch W3).

As shown in FIG. 20, during period PS1, the driving electrode driver 14 performs scanning operations (scanning operations at starting edge) DS1 for supplying driving signals to the driving electrode COML1 which is the driving electrode on the outermost side in the drive range A1. More particularly, during period PS1, the driving electrode driver 14 performs scanning operations DS1 for supplying driving signals to the driving electrode COML1 disposed at the end portion on the positive side in the Y axis direction of the array CA1 comprised of a plurality of driving electrodes COML.

The intensity of detection signals during period PS1 is the strongest when the input tool has contacted or approached the driving electrode COML1 (CASE 1), the second strongest when the input tool has contacted or approached the driving electrode COML2 (CASE 2), and the weakest and substantially equal to zero when the input tool has contacted or approached the driving electrode COML3 (CASE 3).

Next, the driving electrode driver 14 performs scanning operations in which the driving electrodes COML are scanned in a time-sharing manner in the order of drive ranges A1, A2, A3, A4 . . . AN4 (N4≥2). More particularly, the driving electrode driver 14 performs scanning operations D1, D2, D3, . . . DN4 (N4≥2). In each of the scanning operations, three successively disposed driving electrodes COML are selected from among the plurality of driving electrodes COML. Then, driving signals are supplied to the driving electrode COML disposed at the end portion on the positive side in the Y axis direction of the array CA2 comprised of the three selected driving electrodes COML and to the driving electrode COML disposed at the end portion on the negative side in the Y axis direction of the array CA2. Further, the driving electrode driver 14 repeats the scanning operations for N4 (N4≥2) number of times, that is, a plurality of times, by shifting each of the selected three driving electrodes COML two by two in a direction opposite to the positive side in the Y axis direction, that is, to the negative side.

At this time, in the second embodiment, either no driving signals are supplied to driving electrode COML disposed at the central portion of the array CA2 in each of the scanning operations or a fixed potential is applied instead of the rectangular waveforms, namely the pulse waveforms, unlike the first embodiment. Alternatively, driving signals having a weaker intensity than the intensity of driving signals supplied to either of the two driving electrodes COML disposed at both end portions of the array CA2 are supplied to the driving electrode COML disposed at the central portion of the array CA2.

Namely, in the second embodiment, N2 (N2≥2) number of successively disposed driving electrodes COML are selected in each of the scanning operations. Then, either no driving signals are supplied or driving signals having a weaker intensity than the intensity of driving signals supplied to either of the two driving electrodes COML at both end portions of the array CA2 are supplied to the driving electrode COML disposed at the central portion of the array CA2 comprised of the selected N2 number of driving electrodes COML. The scanning operations are repeated a plurality of times by shifting each of the N2 number of selected driving electrodes N3 by N3 (N3≥2) to the negative side in the Y axis direction. N3 is less than N2. Accordingly, N2 is not limited to 3, and N3 is not limited to 2. For example, it is possible that N2 is 5 and that N3 is 4.

When the input tool has contacted or approached the driving electrode COML1 (CASE 1), the intensity of detection signals during period P1 is substantially equal to the intensity of detection signals during period PS1, and the intensity of detection signals during P2 reduces to substantially zero. When the input tool has contacted or approached the driving electrode COML2 (CASE 2), the intensity of detection signals during period P1 increases more than the intensity of detection signals during period PS1, the detection signals gradually reduce in the order of period P1, P2 and P3, and the intensity of detection signals during P3 becomes substantially zero. When the input tool has contacted or approached the driving electrode COML3 (CASE 3), the intensity of detection signals during period PS1 is substantially zero, the intensity of detection signals during period P1 increases more than the intensity of detection signals during period PS1, the intensity of detection signals during period P2 is substantially equal to the intensity of detection signals during period P1, and the intensity of detection signals during P3 reduces to substantially zero.

Also in the example shown in FIG. 20, since the scanning pitch W3 is smaller than the touch detection width W2 as in the example shown in FIG. 11, it is possible to make the intensity of detection signals strong even when the input tool has contacted or approached driving electrodes COML disposed at end portions in the scanning direction (Y axis direction) of the array CA2 comprised of driving electrodes COML included in the drive range.

Further, also in the example shown in FIG. 20, driving signals are supplied to the driving electrode COML1 during period PS1 in drive range AS1 which is smaller than the drive range A1 as in the example shown in FIG. 11. Thus, it is possible to improve the position resolution when detecting touch positions in the periphery of the starting edge of the array CA1 comprised of a plurality of driving electrodes COML, and to improve the touch sensitivity with respect to touch.

Thereafter, during period PE1, the driving electrode driver 14 performs scanning operations (scanning operations at terminal edge) DE1 for supplying driving signals to the driving electrode COML on the outermost side in the drive range AN4 (N4≥2). More particularly, during period PE1, the driving electrode driver 14 performs scanning operations DE1 for supplying driving signals to the driving electrode COML disposed at the end portion on the negative side in the Y axis direction of the array CA1 comprised of a plurality of driving electrodes COML.

Also in the example shown in FIG. 20, driving signals are supplied to the driving electrodes COML during period PE1 in drive range AE1 which is smaller than the drive range AN4, as in the example shown in FIG. 11. Thus, it is possible to improve the position resolution when detecting touch positions in the periphery of the terminal edge of the array CA1 comprised of a plurality of driving electrodes COML, and to improve the touch sensitivity with respect to touch.

In the case shown in FIG. 21, namely, in case of the first embodiment, equal driving signals are supplied to all of the driving electrodes COML of the array CA2. In such a case, the intensity of detection signals when the input tool is positioned on the driving electrode COML disposed at the central portion of the array CA2 becomes too large, and the height of the input tool when the intensity of the detection signals exceeds a threshold TH, namely the detection limit height becomes too large. Further, since input positions are detected even when the input tool has separated from the detection surface of the touch panel to some extent, the performance of the input device is degraded due to, for example, linking portions of respective letters input to the touch panel by handwriting.

In this respect, in the case shown in FIG. 21, the intensity of detection signals when the input tool is positioned on the driving electrodes COML disposed at end portions of the array CA2 is not too large but suitable and the detection limit height is also not too large but suitable.

On the other hand, in case of the second embodiment, either no driving signals are supplied or driving signals having a weaker intensity than the intensity of driving signals supplied to the driving electrodes COML disposed at end portions of the array CA2 are supplied to driving electrode COML disposed at the central portion of the array CA2 comprised of selected driving electrodes COML. Therefore, the intensity of detection signals when the input tool is positioned on the driving electrodes COML disposed at the central portion of the array CA2 is made to be weaker than that of the case indicated as "Example 1 (central portion)" in FIG. 21 to be closer to the intensity of the case indicated as "Example 1 (end portion)" in FIG. 21. Since input positions will not be detected when the input tool has separated from the detection electrodes TDL to some extent, it is possible to improve the performance of the input device by preventing or restricting, for example, linking portions of respective letters input to the touch panel by handwriting.

In this respect, also in the second embodiment, it is possible to perform the scanning operations DS2 at the starting edge and the scanning operations DE2 at the terminal edge as explained in the first embodiment using FIG. 12 instead of performing the scanning operations DS1 at the starting edge and the scanning operations DE1 at the terminal edge explained using FIG. 20. In this case, it is possible to achieve the same effects as the case explained in the first embodiment using FIG. 12.

Also, also in the second embodiment, it is possible to perform the scanning operations DS2 at the starting edge and the scanning operations DE2 at the terminal edge as explained in the first embodiment using FIG. 13 in addition to performing the scanning operations DS1 at the starting edge and the scanning operations DE1 at the terminal edge explained using FIG. 20. In this case, it is possible to achieve the same effects as the case explained in the first embodiment using FIG. 13.

First Modification Example of Second Embodiment

Next, a first modification example of the second embodiment will be explained with reference to FIG. 1, FIG. 22 and FIG. 23.

Figure 22:
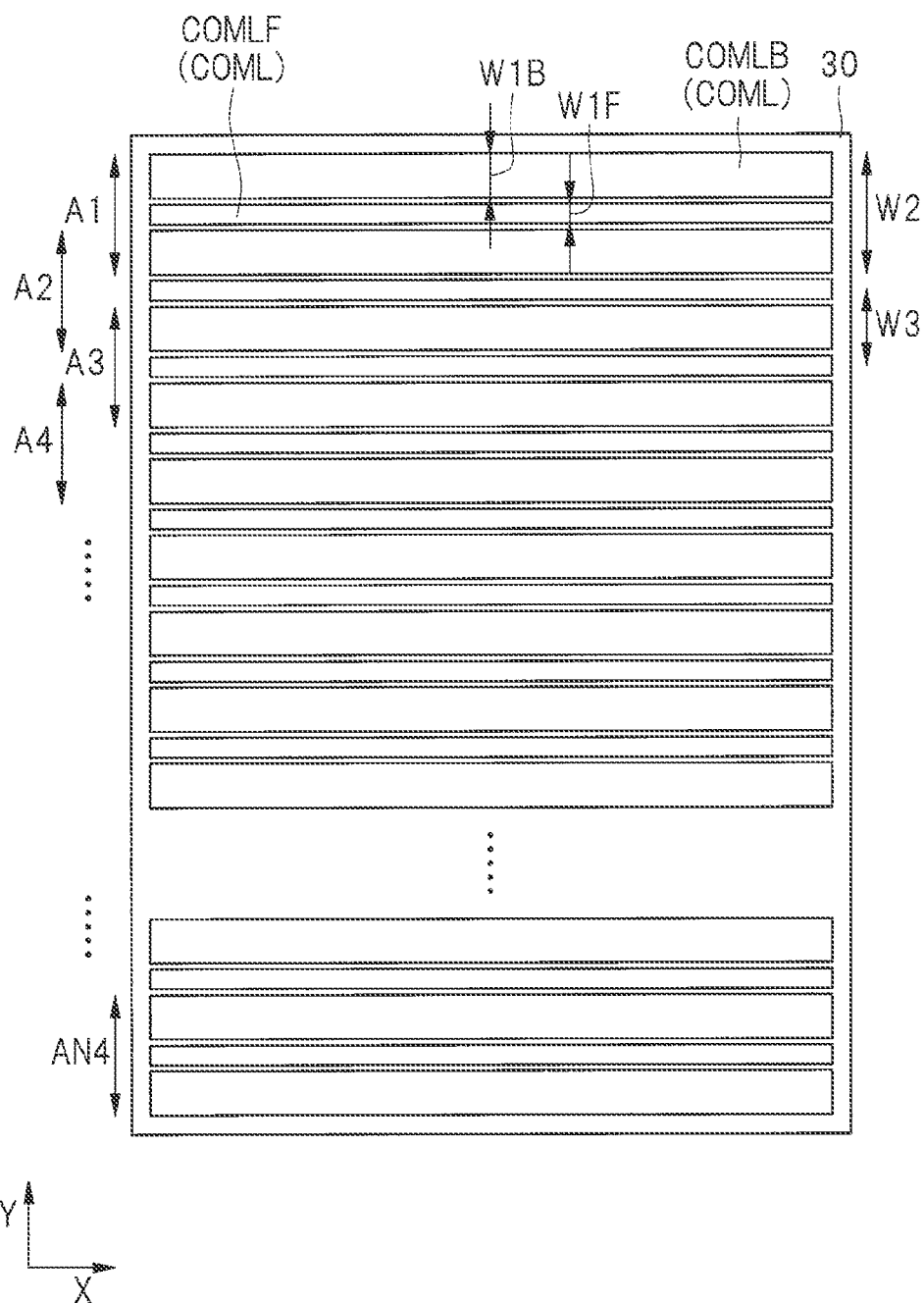
FIG. 22 is a plan view showing a disposition of driving electrodes in a display according to a first modification example of the second embodiment.

FIG. 22 is a plan view showing a disposition of driving electrodes in a display according to a first modification example of the second embodiment. FIG. 23 is a diagram showing an operation example of scanning operations in the display according to the first modification example of the second embodiment. In FIG. 23, selected driving electrodes COML in each of the periods PS1 and PE1 are indicated by hatchings, and driving electrodes COML disposed at both end portions of the array CA2 comprised of selected driving electrodes COML in each of the periods P1, P2, P3 and PN4 are indicated by hatchings. Further, in FIG. 23, when an input tool has contacted or approached each of the three driving electrodes COML1, COML2 and COML3 included in the drive range A1, intensities of detection signals during each of the periods PS1, P1, P2 and P3 are shown schematically as a graph.

Figure 24:
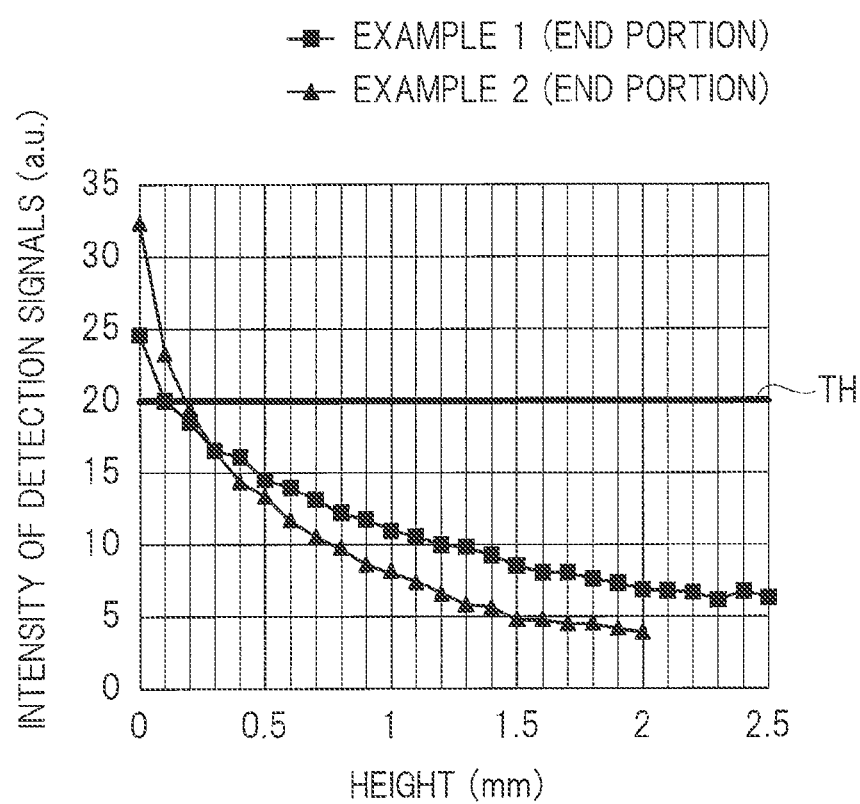
FIG. 24 is a graph showing a relationship of height of the input tool and intensity of the detection signals when performing scanning operations of the first embodiment and the first modification example of the second embodiment.

FIG. 24 is a graph showing a relationship of height of the input tool and the intensity of detection signals when performing scanning operations of the first embodiment and the first modification example of the second embodiment. FIG. 24 shows cases in which the input tool is positioned on the driving electrodes COML disposed at end portions of the array CA2 comprised of the selected plurality of driving electrodes COML in Example 1 as one example of the first embodiment (indicated as "Example 1 (end portion)). Further, FIG. 24 shows cases in which the input tool is positioned on the driving electrodes COML disposed at end portions of the array CA2 in Example 2 as one example of the first modification example of the second embodiment (indicated as "Example 2 (end portion)).

As shown in FIG. 22, in the present first modification example, while the plurality of driving electrodes COML are disposed in parallel, their widths are not equal to each other. The plurality of driving electrodes COML are comprised of a plurality of driving electrodes COMLB and a plurality of driving electrodes COMLF. Each of the plurality of driving electrodes COMLB and each of the plurality of driving electrodes COMLF are alternately arrayed from the positive side towards the negative side in the Y axis direction. Namely, the plurality of driving electrodes COMLB are respectively disposed at odd-numbered positions of the array CA1 from the end portion on the positive side in the Y axis direction of the array CA1 comprised of a plurality of driving electrodes COML towards the end portion on the negative side in the Y axis direction of the array CA1. The plurality of driving electrodes COMLF are respectively disposed at even-numbered positions of the array CA1 from the end portion on the positive side in the Y axis direction of the array CA1 comprised of a plurality of driving electrodes COML towards the end portion on the negative side in the Y axis direction of the array CA1. The width W1B of each of the plurality of driving electrodes COMLB in the Y axis direction is larger than the width W1F of each of the plurality of driving electrodes COMLF in the Y axis direction.

Also in the present first modification example, as in the case of the second embodiment explained using FIG. 21, the driving electrode driver 14 scans the driving electrodes COML at the touch detection width W2 and the scanning pitch W3 during scanning operations. In the example shown in FIG. 22, the driving electrode driver 14 selects the driving electrodes COML (touch detection width W2) three by three, and each of the selected three driving electrodes COML is scanned by shifting them two by two (scanning pitch W3).

Figure 23:
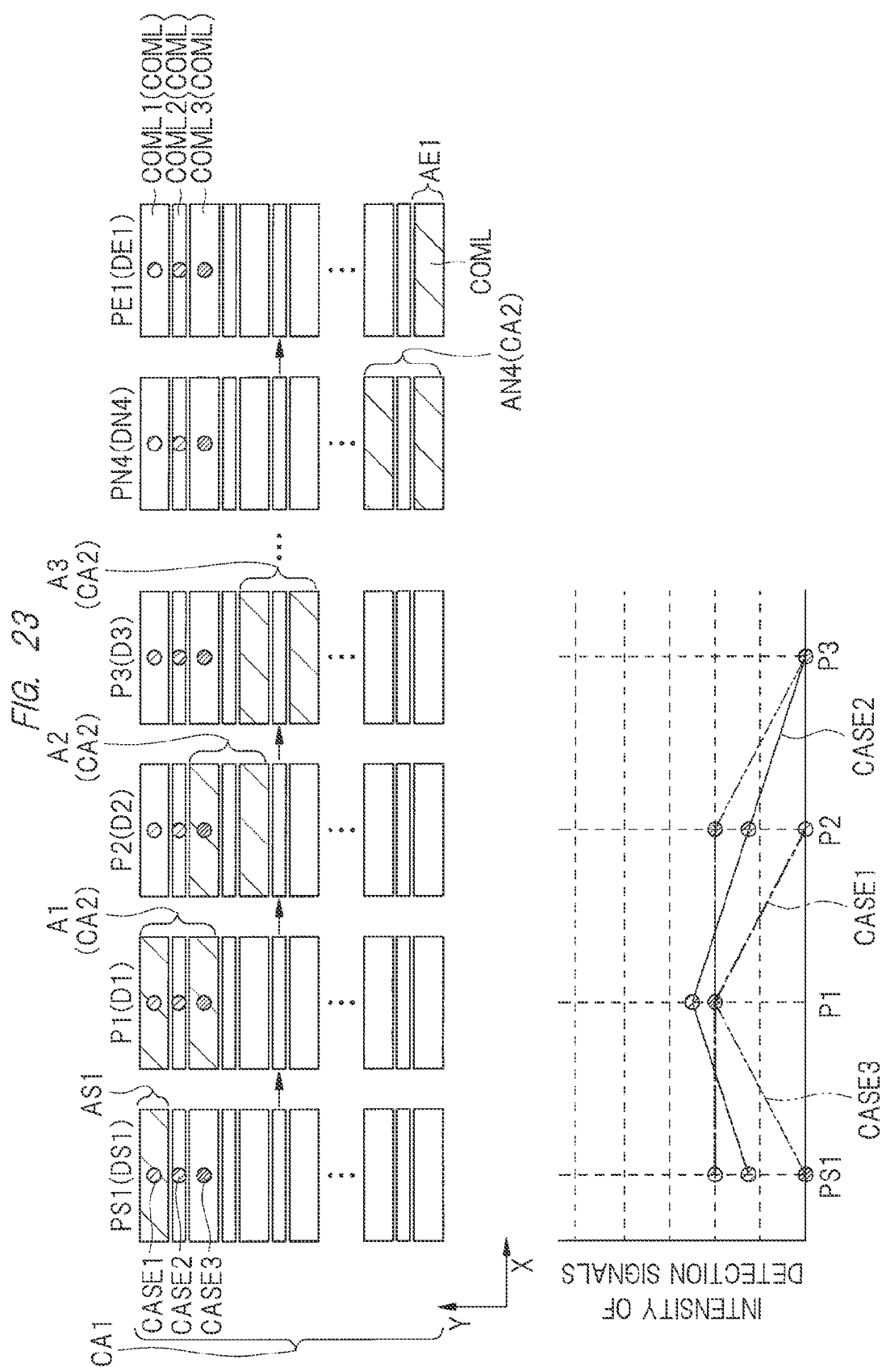
FIG. 23 is a diagram showing an operation example of scanning operations in the display according to the first modification example of the second embodiment.

As shown in FIG. 23, during period PS1, the driving electrode driver 14 performs scanning operations (scanning operations at starting edge) DS1 for supplying driving signals to the driving electrode COML1 which is the driving electrode on the outermost side in the drive range A1. More particularly, during period PS1, the driving electrode driver 14 performs scanning operations DS1 for supplying driving signals to the driving electrode COML1 disposed at the end portion on the positive side in the Y axis direction in the array CA1 comprised of a plurality of driving electrodes COML.

The intensity of detection signals during period PS1 is the strongest when the input tool has contacted or approached the driving electrode COML1 (CASE 1), the second strongest when the input tool has contacted or approached the driving electrode COML2 (CASE 2) and the weakest and substantially equal to zero when the input tool has contacted or approached the driving electrode COML3 (CASE 3).

Next, the driving electrode driver 14 scans the driving electrodes COML in a time-sharing manner in the order of drive range A1, A2, A3, . . . AN4 (N4≥2). More particularly, the driving electrode driver 14 performs scanning operations D1, D2, D3, . . . DN4 (N4≥2). In each of the scanning operations, three driving electrodes COML disposed successively are selected from among the plurality of driving electrodes COML. Then, driving signals are supplied to the driving electrode COML disposed at the end portion on the positive side in the Y axis direction of the array CA2 comprised of the selected three driving electrodes COML, and the driving electrode COML disposed at the end portion on the negative side in the Y axis direction of the array CA2. Further, the driving electrode driver 14 repeats the scanning operations for N4 (N4≥2) number of times, that is, a plurality of times, by shifting each of the selected three driving electrodes COML two by two in a direction opposite to the positive side in the Y axis direction, that is, to the negative side.

Also in the present first modification example as in the second embodiment, no driving signals are supplied to driving electrode COML disposed at the central portion of the array CA2 in each of the scanning operations. Alternatively, driving signals having a weaker intensity than the intensity of driving signals supplied to either of the two driving electrodes COML at both end portions of the array CA2 are supplied to the driving electrode COML disposed at the central portion of the array CA2.

Thereafter, the driving electrode driver 14 supplies driving signals to the driving electrode COML on the outermost side in the drive range AN4 (N4≥2)(scanning operation DE1 at terminal edge). More particularly, during period PE1, the driving electrode driver 14 performs scanning operations DE1 for supplying driving signals to the driving electrode COML disposed at the end portion on the negative side in the Y axis direction of the array CA1 comprised of a plurality of driving electrodes COML.

Also in the present first modification example as in the second embodiment, either no driving signals are supplied or driving signals having a weaker intensity than the intensity of driving signals supplied to the driving electrodes COML at both end portions of the array CA2 are supplied to driving electrode COML disposed at the central portion of the array CA2. Therefore, also in the present first modification example as in the second embodiment, it is possible to set the intensity of detection signals when the input tool is positioned on the driving electrode COML disposed at the central portion of the array CA2 to be weaker than that of the case indicated as "Example 1 (central portion)" in FIG. 21 and to be closer to the intensity of the case indicated as "Example 1 (end portion)" in FIG. 21. Moreover, it is possible to prevent or restrict, for example, linking portions of respective letters input to the touch panel by handwriting, and thereby improving the performance of the input device.

However, in the present first modification example, the width W1B of the driving electrodes COML in the Y axis direction disposed at the end portions of the array CA2 comprised of the selected driving electrodes COML is larger than the width W1F of the driving electrode COML in the Y axis direction disposed at the central portion of the array CA2 comprised of the selected driving electrodes COML. Therefore, it is possible to make the intensity of detection signals when the input tool is positioned on the driving electrodes COML disposed at end portions of the array CA2 stronger than that of the first embodiment, while making the intensity of detection signals when the input tool is positioned on the driving electrode COML disposed at the central portion of the array CA2 weaker. Namely, as shown in FIG. 24, the intensity of detection signals when the input tool is positioned on the driving electrodes COML disposed at end portions of the array CA2 is stronger in Example 2 which is an example of the present first modification example (Example 2 (end portion)), when compared to that of Example 1 which is an example of the first embodiment (Example 1 (end portion)).

In this respect, also in the present first modification example as in the second embodiment, it is possible to perform the scanning operations DS2 at the starting edge and the scanning operations DE2 at the terminal edge as explained in the first embodiment using FIG. 12 instead of performing the scanning operations DS1 at the starting edge and the scanning operations DE1 at the terminal edge explained using FIG. 23. Further, also in the present first modification example as in the second embodiment, it is possible to perform the scanning operations DS2 at the starting edge and the scanning operations DE2 at the terminal edge as explained in the first embodiment using FIG. 13 in addition to performing the scanning operations DS1 at the starting edge and the scanning operations DE1 at the terminal edge explained using FIG. 23.

Second Modification Example of Second Embodiment

Next, a second modification example of the second embodiment will be explained with reference to FIG. 25 and FIG. 26.

Figure 25:
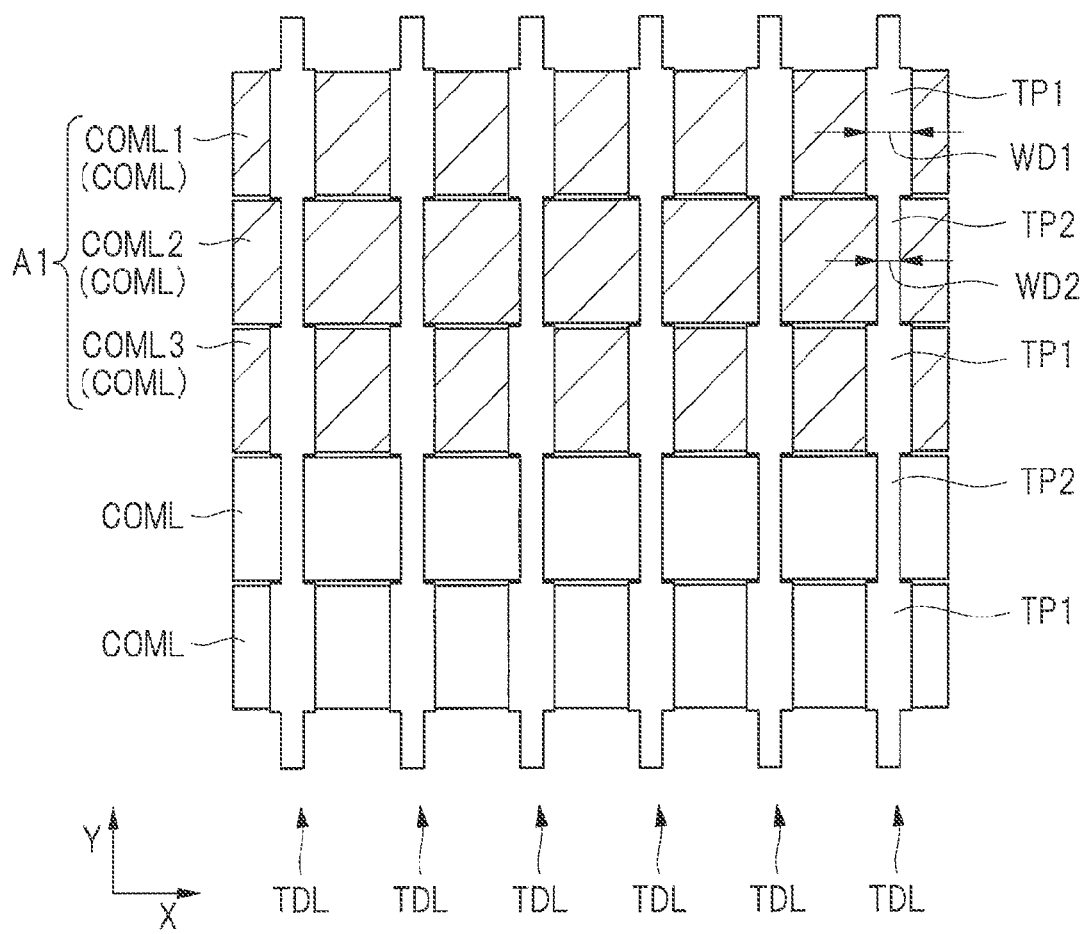
FIG. 25 is a plan view showing an example of detection electrodes according to a second modification example of the second embodiment.

FIG. 25 is a plan view showing an example of detection electrodes according to a second modification example of the second embodiment. In FIG. 25, driving electrodes COML are shown in addition to detection electrodes TDL.

In the example shown in FIG. 25, each of the plurality of detection electrodes TDL includes a plurality of portions TP1 and a plurality of portions TP2. Each of the plurality of portions TP1 overlaps, when seen in a plan view, each of the plurality of driving electrodes COML respectively disposed at odd-numbered positions of the array CA1 from the end portion on the positive side in the Y axis direction of the array CA1 comprised of a plurality of driving electrodes COML towards the end portion on the negative side in the Y axis direction of the array CA1. Each of the plurality of portions TP2 overlaps, when seen in a plan view, each of the plurality of driving electrodes COML respectively disposed at even-numbered positions of the array CA1 from the end portion on the positive side in the Y axis direction of the array CA1 towards the end portion on the negative side in the Y axis direction of the array CA1.

Each of the plurality of portions TP1 extends in the Y axis direction and each of the plurality of portions TP2 extends in the Y axis direction, and each of the plurality of portions TP1 is alternately connected in series with each of the plurality of portions TP2 in the Y axis direction. The width WD2 of each of the plurality of portions TP2 in the X axis direction is smaller than the width WD1 of each of the plurality of portions TP1 in the X axis direction.

In this respect, in the example shown in FIG. 25, in each of the scanning operations, driving signals having an intensity equal to the intensity of driving signals supplied to the driving electrodes COML disposed at end portions of the array CA2 are supplied to the driving electrode COML disposed at the central portion of the array CA2 comprised of the selected plurality of driving electrodes COML (see, for example, FIG. 11). In the example shown in FIG. 25, the driving electrodes COML1, COML2 and COML3 are hatched to show that driving signals are supplied not only to the driving electrodes COML1 and COML3 but also to the driving electrode COML2 from among the three driving electrodes COML1, COML2 and COML2 included in the drive range A1.

Also in such a case, the intensity of detection signals when the input tool is positioned on the driving electrode COML disposed at the central portion of the array CA2 comprised of the selected plurality of driving electrodes COML can be made weaker, when compared to a case in which the width WD2 of portions TP2 is equal to the width WD1 of portions TP1. Therefore, it is possible to make the intensity of detection signals when the input tool is positioned on the driving electrode COML disposed at the central portion of the array CA2 weak, and to make the height of the input tool when the intensity of detection signals exceeds a threshold, namely the detection limit height, low. Further, it is possible to prevent or restrict that input positions are detected even when the input tool has separated from the detection surface of the touch panel to some extent, and thereby improving the performance of the input device.

Figure 26:
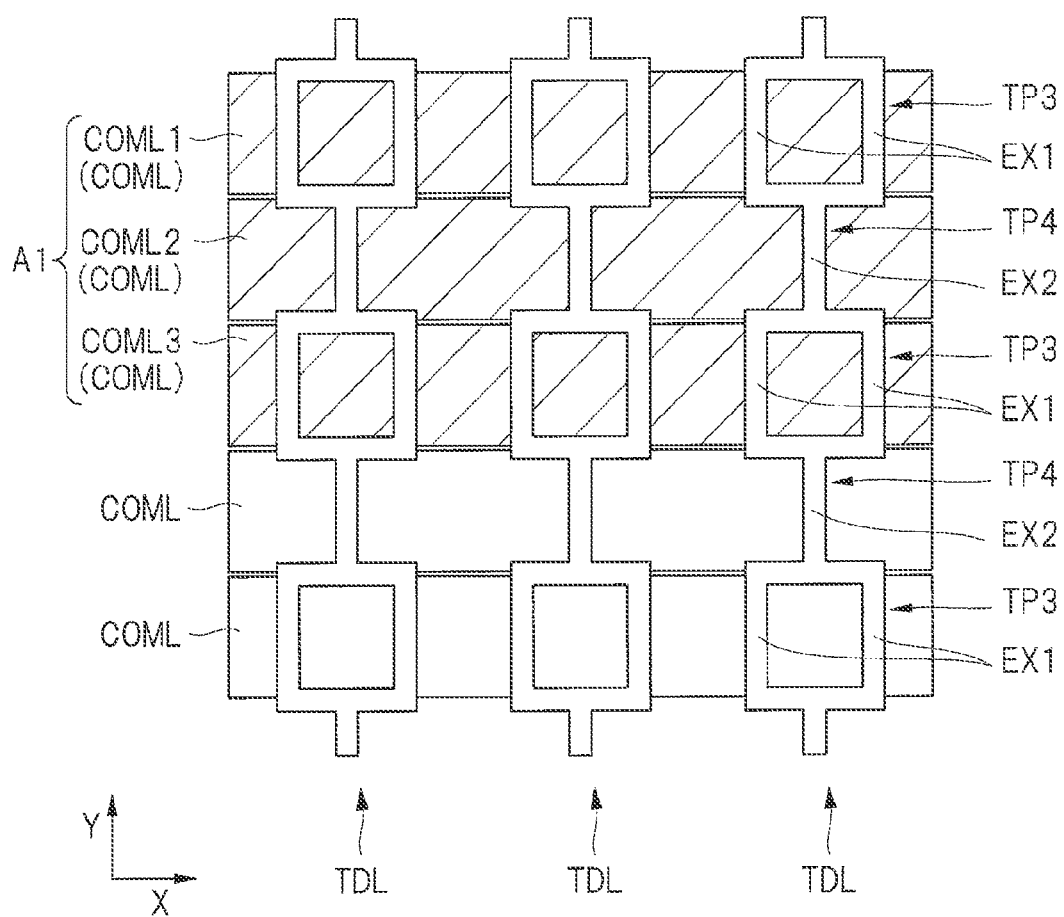
FIG. 26 is a plan view showing another example of detection electrodes in the second modification example of the second embodiment.

FIG. 26 is a plan view showing another example of detection electrodes in the second modification example of the second embodiment. In this respect, in FIG. 26, driving electrodes COML are shown in addition to detection electrodes TDL.

In the example shown in FIG. 26, each of the plurality of detection electrodes TDL includes a plurality of portions TP3 and a plurality of portions TP4. Each of the plurality of portions TP3 overlaps, when seen in a plan view, each of the plurality of driving electrodes COML respectively disposed at odd-numbered positions of the array CA1 from the end portion on the positive side in the Y axis direction of the array CA1 comprised of a plurality of driving electrodes COML towards the end portion on the negative side in the Y axis direction of the array CA1. Each of the plurality of portions TP4 overlaps, when seen in a plan view, each of the plurality of driving electrodes COML respectively disposed at even-numbered positions of the array CA1 from the end portion on the positive side in the Y axis direction of the array CA1 towards the end portion on the negative side in the Y axis direction of the array CA1.

Each of the plurality of portions TP3 is comprised of two extending portions EX1 respectively extending in the Y axis direction. The two extending portions EX1 are disposed at intervals in the X axis direction and are connected to each other in parallel. Each of the plurality of portions TP4 is comprised of an extending portion EX2 extending in the Y axis direction. Each of the plurality of portions TP3 is alternately connected in series with each of the plurality of portions TP4 in the Y axis direction.

In this respect, in the example shown in FIG. 26, in each of the scanning operations, driving signals having an intensity equal to the intensity of driving signals supplied to the driving electrodes COML disposed at end portions of the array CA2 are supplied to the driving electrode COML disposed at the central portion of the array CA2 comprised of the selected plurality of driving electrodes COML (see, for example, FIG. 11). In the example shown in FIG. 26, the driving electrodes COML1, COML2 and COML3 are hatched to show that driving signals are supplied not only to the driving electrodes COML1 and COML3 but also to the driving electrode COML2 from among the three driving electrodes COML1, COML2 and COML2 included in the drive range A1.

Also in such a case, the intensity of detection signals when the input tool is positioned on the driving electrode COML disposed at the central portion of the array CA2 comprised of the selected plurality of driving electrodes COML can be made weaker, when compared to a case in which the portions TP4 are comprised of two extending portions EX2 which are serially connected as in the portions TP3. Therefore, it is possible to make the intensity of detection signals when the input tool is positioned on the driving electrode COML disposed at the central portion of the array CA2 weak, and to make the height of the input tool when the intensity of detection signals exceeds a threshold, namely the detection limit height, low. Further, it is possible to prevent or restrict that input positions are detected even when the input tool has separated from the detection surface of the touch panel to some extent, and thereby improving the performance of the input device.

Third Embodiment

In the scanning operations of the second embodiment, scanning operations of the starting edge and scanning operations of the terminal edge are performed. In contrast thereto, no scanning operations of the starting edge and the terminal edge are performed in the third embodiment.

Features of the display according to the third embodiment such as the overall configuration other than the scanning operations are similar to the features of the display according to the second embodiment and explanations thereof will be omitted.

Scanning Operations

Next, scanning operations will be explained with reference to FIG. 1 and FIG. 27. In this respect, in the following description, the driving electrode driver 14 selects the driving electrodes COML three by three (touch detection width 2), and there will be explained a case where each of the selected three driving electrodes COML is scanned by shifting them two by two (scanning pitch W3). Further, in the following description, points that are different from those of the second embodiment will be mainly explained.

Figure 27:
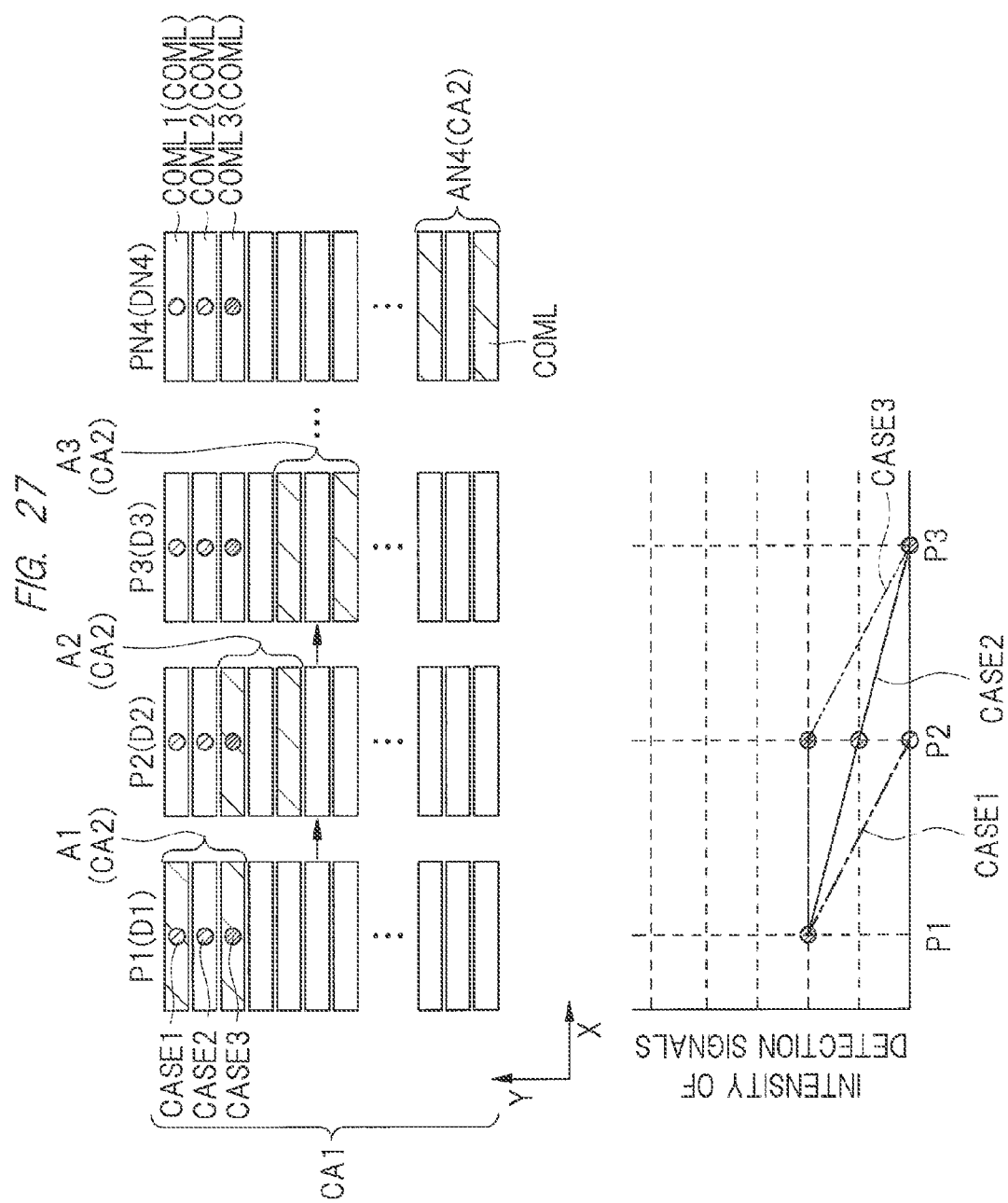
FIG. 27 is a diagram showing an operation example of scanning operations in a display according to a third embodiment.

FIG. 27 is a diagram showing an operation example of scanning operations in a display according to the third embodiment. In FIG. 27, in each of the periods P1, P2, P3 and PN4, driving electrodes COML disposed at both end portions of the array CA2 comprised of the selected plurality of driving electrodes COML are indicated by hatchings. Further, in FIG. 27, when an input tool has contacted or approached each of the three driving electrodes COML1, COML2 and COML3 included in the drive range A1, intensities of detection signals during each of the periods P1, P2 and P3 are shown schematically as a graph.

Also in the third embodiment as in the second embodiment, the driving electrode driver 14 scans the driving electrodes COML in a time-sharing manner in the order of drive range A1, A2, A3, . . . AN4 (N4≥2). Further, the scanning operations of the third embodiment shown in FIG. 27 are scanning operations except for the scanning operations DS1 at the starting edge and the scanning operations DE1 at the terminal edge which are explained using FIG. 20.

Also in the example shown in FIG. 27, as in the example shown in FIG. 20, since the scanning pitch W3 is smaller than the touch detection width W2, it is possible to make the intensity of detection signals strong even when the input tool has contacted or approached the driving electrodes COML disposed at end portions in the scanning direction (Y axis direction) of the array CA2 comprised of driving electrodes COML included in the drive range. Further, also in the example shown in FIG. 27, as in the case shown in FIG. 20, it is possible to make the intensity of detection signals when the input tool is positioned on the driving electrode COML disposed at the central portion of the array CA2 weak. As a result, it is possible to prevent or restrict, for example, linking portions of respective letters input to the touch panel by handwriting, and thereby improving the performance of the input device.

Accordingly, it is not necessary to improve the position resolution when detecting touch positions in the periphery of the starting edge or in the periphery of the terminal end of the array CA1 comprised of driving electrodes COML, and in a case where it is not necessary to improve the detection sensitivity with respect to touch, it is possible to apply the third embodiment to the case instead of the second embodiment.

Modification Example of Third Embodiment

Figure 28:
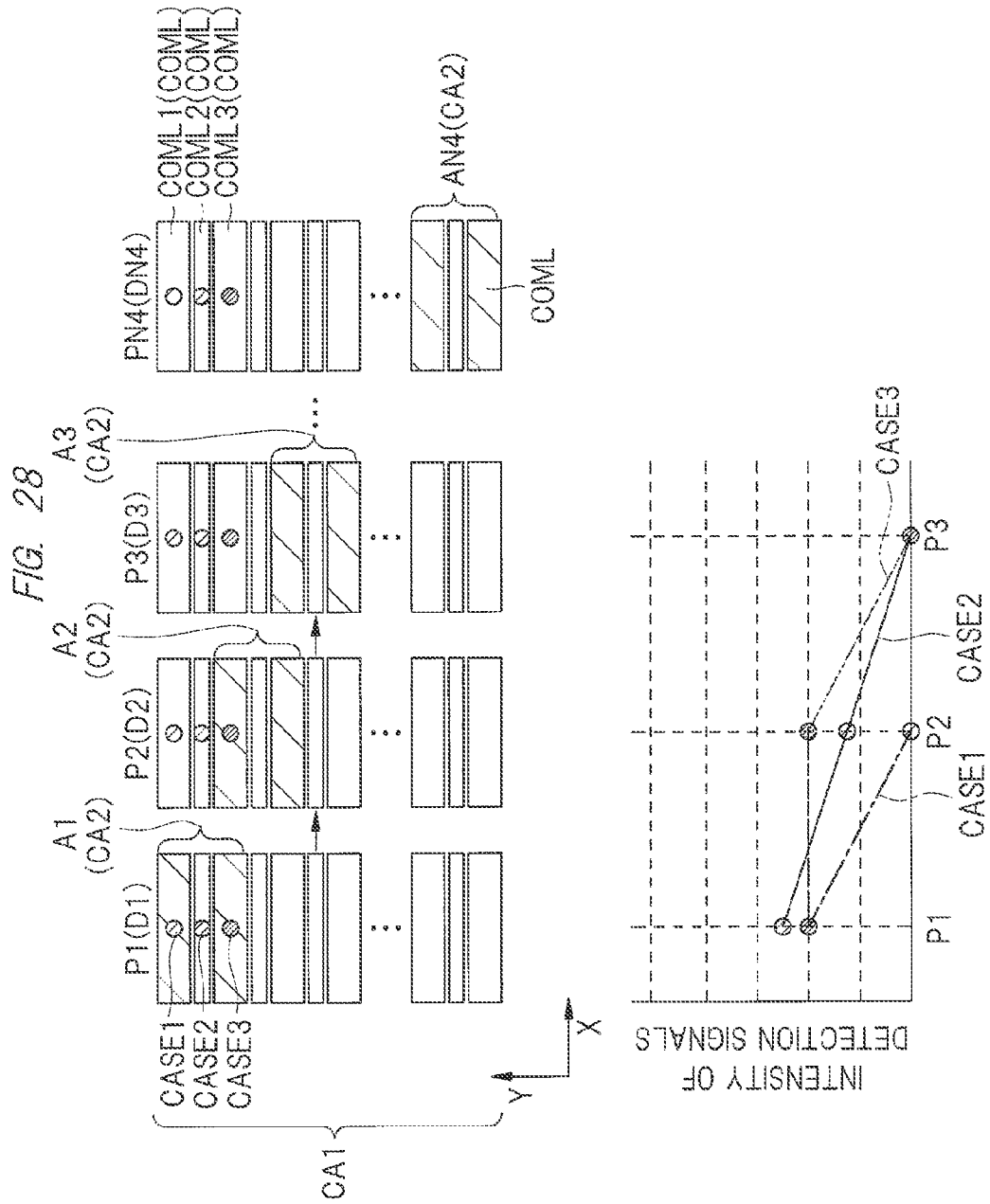
FIG. 28 is a diagram showing an operation example of scanning operations in a display according to a modification example of the third embodiment.

Next, a modification example of the third embodiment will be explained with reference to FIG. 1 and FIG. 28. FIG. 28 is a diagram showing an operation example of scanning operations in a display according to a modification example of the third embodiment. In FIG. 28, in each of the periods P1, P2, P3 and PN4, driving electrodes COML disposed at both end portions of the array CA2 comprised of the selected driving electrodes COML are indicated by hatchings. Further, in FIG. 28, when an input tool has contacted or approached each of the three driving electrodes COML1, COML2 and COML3 included in the drive range A1, intensities of detection signals during each of the periods P1, P2 and P3 are shown schematically as a graph.

Also in the present modification example as in the first modification example of the second embodiment, the driving electrode driver 14 scans the driving electrodes COML in a time-sharing manner in the order of drive range A1, A2, A3, . . . AN4 (N4≥2). Further, the scanning operations of the present modification example shown in FIG. 28 are scanning operations except for the scanning operations DS1 at the starting edge and the scanning operations DE1 at the terminal edge which are explained using FIG. 23.

Also in the example shown in FIG. 28, as in the example shown in FIG. 23, since the scanning pitch W3 is smaller than the touch detection width W2, it is possible to make the intensity of detection signals strong even when the input tool has contacted or approached the driving electrodes COML disposed at end portions in the scanning direction (Y axis direction) of the array CA2 comprised of driving electrodes COML included in the drive range. Further, also in the example shown in FIG. 28, as in the case shown in FIG. 23, it is possible to make the intensity of detection signals when the input tool is positioned on the driving electrodes COML disposed at the central portion of the array CA2 weak. As a result, it is possible to prevent or restrict, for example, linking portions of respective letters input to the touch panel by handwriting, and thereby improving the performance of the input device.

Accordingly, it is not necessary to improve the position resolution when detecting touch positions in the periphery of the starting edge or in the periphery of the terminal edge of the array CA1 comprised of driving electrodes COML, and in case where it is not necessary to improve the detection sensitivity with respect to touch, it is possible to apply the present modification example to the case instead of the first modification example of the second embodiment.

Fourth Embodiment

In the first embodiment, the second embodiment and their modification examples, the third embodiment and its modification example, it has been explained about cases in which a touch panel of mutual capacity method is applied as a touch panel. However, it is also possible to apply a touch panel of self-capacity method as the touch panel.

Figure 29:
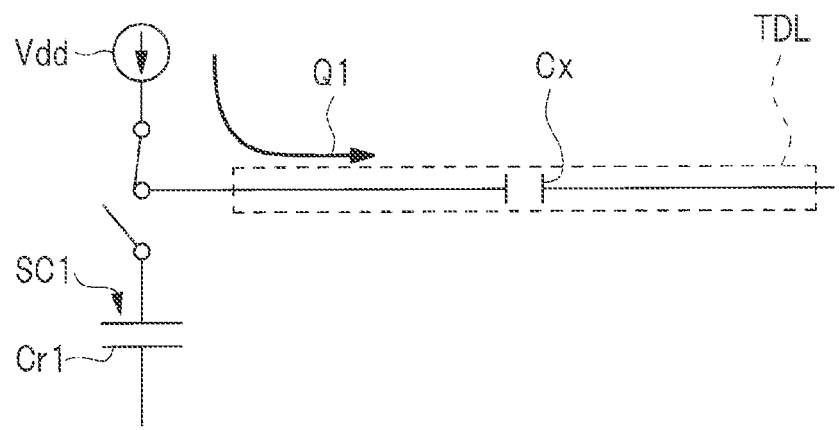
FIG. 29 is an explanatory view showing an electrical connection state of detection electrodes of self-capacity method.
Figure 30:
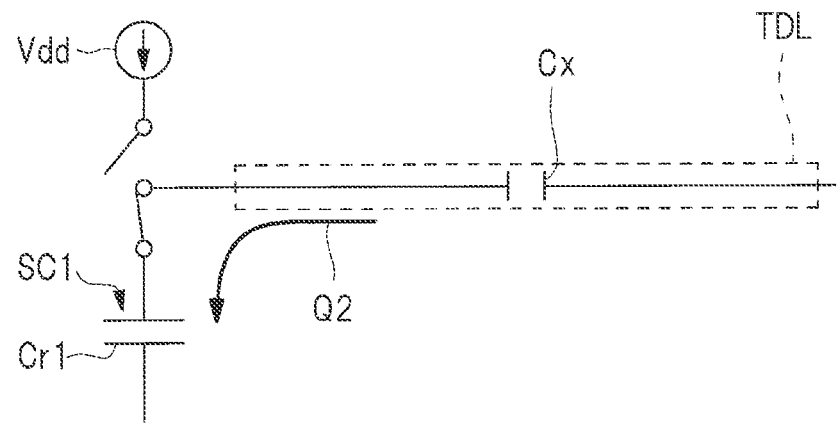
FIG. 30 is an explanatory view showing an electrical connection state of detection electrodes of self-capacity method.

FIG. 29 and FIG. 30 are explanatory views showing electrical connection states of detection electrodes of self-capacity method.

In a touch panel of self-capacity method, as shown in FIG. 29, when detection electrodes TDL having an electrostatic capacity Cx are separated from a detection circuit SC1 having an electrostatic capacity Cr1, and they are electrically connected to a power source Vdd, an electric charge Q1 is accumulated in the detection electrodes TDL having the electrostatic capacity Cx. Next, as shown in FIG. 30, when the detection electrodes TDL having the electrostatic capacity Cx are separated from the power source Vdd, and they are electrically connected to the detection circuit SC1 having the electrostatic capacity Cr1, an electric charge Q2 flowing to the detection circuit SC1 is detected.

Here, when a finger has contacted or approached the detection electrodes TDL, the electrostatic capacity Cx of the detection electrodes TDL is changed due to the capacity of the finger, and when the detection electrodes TDL are connected to the detection circuit SC1, the electric charge Q2 flowing to the detection circuit SC1 also changes. Accordingly, by measuring the electric charge Q2 flowing out by the detection circuit SC1 and detecting changes in the electrostatic capacity Cx of the detection electrodes TDL, it is possible to determine whether a finger has contacted or approached the detection electrodes TDL.

Alternatively, the display might also include a plurality of detection electrodes TDL respectively extending in the X axis direction (see FIG. 5) and being disposed at intervals in the Y axis direction (see FIG. 5), and a plurality of detection electrodes TDL respectively extending in the Y axis direction and being disposed at intervals in the X axis direction. In such a case, it is possible to detect input positions two-dimensionally by detecting changes in the electrostatic capacity Cx of the plurality of detection electrodes TDL extending in each direction.

Also with such a display, it is possible to apply driving methods similar to the driving methods of the driving electrodes COML according to the above-described first embodiment, the second embodiment and their modification examples and the third embodiment and its modification example as a method for driving, for example, the plurality of detection electrodes TDL respectively extending in the X axis direction. Thus, it is possible to improve the detection sensitivity and the position resolution even when the input tool has contacted or approached any of, for example, boundaries of drive ranges or end portions of the display region. As a result, it is possible to have effects similar to the effects of the display according to the first embodiment, the second embodiment and their modification examples and the third embodiment and its modification example.

In the foregoing, the invention made by the inventors of the present invention has been concretely described based on the embodiments. However, it is needless to say that the present invention is not limited to the foregoing embodiments and various modifications and alterations can be made within the scope of the present invention.

Further, in the foregoing embodiments, the cases of a liquid crystal display device have been illustrated as disclosure examples, but all kinds of flat-panel displays such as an organic EL display, other self-luminous type displays and electronic paper displays having electrophoresis elements may be listed as other application examples. Further, it goes without saying that the present invention is applicable to small, medium and large sized devices without any particular limitation.

In the category of the idea of the present invention, a person with ordinary skill in the art can conceive various modified examples and revised examples, and such modified examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is effective when applied to displays.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display comprising:
a first substrate;
a second substrate opposed to the first substrate with a liquid crystal layer therebetween;
a plurality of first electrodes extending in the first direction in a detection region;
a plurality of second electrodes extending in the second direction crossing the plurality of first electrodes in the detection region;
a driving circuit supplying driving signals to the plurality of first electrodes; and
a detection circuit detecting an input position based on electrostatic capacities between the plurality of second electrodes and the plurality of first electrodes,
wherein the driving circuit performs:
first driving operations for supplying the driving signals to a first electrode disposed at a first end portion of the detection region, or to each of a first number of first electrodes of two or more electrodes including the first electrode disposed at the first end portion of the detecting region; and
second driving operations for supplying the driving signals to each of a second number of first electrodes including a first electrode disposed at a first end portion of the detection region,
wherein the driving circuit repeats the second driving operations a plurality of times by shifting each of the selected second number of first electrodes by a third number in the second direction,
wherein the second number is greater than the first number,
wherein the first number of first electrodes in the first driving operations are disposed successively in the second direction,
wherein the second number of first electrodes in the second driving operations are disposed successively in the second direction,
wherein the third number is less than the second number,
wherein the driving circuit performs fifth driving operations for supplying the driving signals to a first electrode disposed at a second end portion of the detection region on an opposite side of the first end portion of the detection region in the second direction, or to each of a fourth number of first electrodes of two or more electrodes including the first electrode disposed at the second end portion of the detection region, wherein the driving circuit repeats the second driving operations by shifting each of the selected second number of first electrodes by the third number to the second end portion of the detection region in the second direction, wherein the fourth number of first electrodes in the fifth driving operations are disposed successively in the second direction, and wherein the fourth number is less than the second number.

2. The display according to claim 1, including a group of electrodes comprised of a plurality of the second electrodes disposed successively in the first direction, wherein the detection circuit detects an input position based on second electrostatic capacities obtained by adding first electrostatic capacities as the electrostatic capacities between each of the plurality of second electrodes included in the group of electrodes and the plurality of first electrodes, in the first driving operations and the second driving operations which are repeated a plurality of times.

3. The display according to claim 2,
wherein the detection circuit includes:
a plurality of conversion circuits which are respectively connected to each of the plurality of second electrodes included in the group of electrodes, and which respectively convert detection signals from each of the plurality of second electrodes included in the group of electrodes into the first electrostatic capacities; and
an adding circuit, which is connected to each of the plurality of conversion circuits, for obtaining the second electrostatic capacities by respectively adding the first electrostatic capacities converted in each of the plurality of conversion circuits.

4. The display according to claim 1,
wherein $N1=N3 \times n+(N2-N3)$ is satisfied where N1 is a total number of the first electrodes, N2 is the second number, N3 is the third number and n is a natural number.

5. The display according to claim 1,
wherein the second number is 3,
wherein the third number is 2,
wherein in the second driving operations, the driving circuit supplies:
first driving signals to a first end portion and a second end portion of the second number of first electrodes; and
a second driving signal, which is weaker than the first driving signals to a first electrode disposed at a portion between the first end portion and the second end portion of the second number of first electrodes.

6. The display according to claim 5,
wherein a width in the second direction of each of the plurality of first electrodes disposed at even-numbered positions from the first end portion of the detection region is smaller than a width in the second direction of each of the plurality of first electrodes disposed at odd-numbered positions from the first end portion of the detection region.

7. The display according to claim 1,
wherein the second number is 3,
wherein the third number is 2,
wherein each of the plurality of second electrodes includes:
a plurality of first portions overlapping, when seen in a plan view, each of the plurality of first electrodes disposed at odd-numbered positions from the first end portion of the detection region; and
a plurality of second portions overlapping, when seen in a plan view, each of the plurality of first electrodes disposed at even-numbered positions from the first end portion of the detection region,
wherein each of the plurality of first portions is alternately connected in series with each of the plurality of second portions in the second direction, and
wherein a width in the first direction of each of the plurality of second portions is smaller than a width in the first direction of each of the plurality of first portions.

8. The display according to claim 1,
wherein the second number is 3,
wherein the third number is 2,
wherein each of the plurality of second electrodes includes:
a plurality of third portions overlapping, when seen in a plan view, each of the plurality of first electrodes disposed at odd-numbered positions from the first end portion of the detection region; and
a plurality of fourth portions overlapping, when seen in a plan view, each of the plurality of first electrodes disposed at even-numbered positions from the first end portion of the detection region,
wherein each of the plurality of third portions is alternately connected in series with each of the plurality of fourth portions in the second direction,
wherein each of the plurality of third portions is comprised of two first extending portions respectively extending in the second direction,
wherein each of the plurality of fourth portions is comprised of a second extending portion extending in the second direction, and
wherein the two first extending portions are disposed at intervals in the first direction and are connected to each other in parallel.

9. The display according to claim 1,
wherein in the first driving operations, the driving circuit performs:
third driving operations for supplying the driving signals to a first electrode disposed at the first end portion of the detection region; and
fourth driving operations for supplying the driving signals to each of the first number of first electrodes.

10. The display according to claim 1, comprising:
a plurality of third electrodes respectively provided at each of the plurality of pixels,
wherein images are displayed through electric fields formed between each of the plurality of third electrodes and any one of the plurality of first electrodes.

11. The display according to claim 2,
wherein the group of electrodes includes connecting portions mutually connecting ends of each of the plurality of second electrodes included in the group of electrodes, and
wherein each of the plurality of second electrodes included in the group of electrodes is connected to the detection circuit via the connecting portions.

12. The display device according to claim 1,
wherein in the fifth driving operations, the driving circuit performs:
sixth driving operations for supplying the driving signals to each of the fourth number of the first electrodes; and
seventh driving operations for supplying the driving signals to the first electrode disposed at the second end portion of the detection region.

13. A display comprising:
a first substrate;
a second substrate opposed to the first substrate with a liquid crystal layer therebetween;
a plurality of first electrodes extending in the first direction in a detection region;
a plurality of second electrodes extending in the second direction crossing the plurality of first electrodes in the detection region;
a driving unit supplying driving signals to the plurality of first electrodes; and
a detection circuit detecting an input position based on electrostatic capacities between the plurality of second electrodes and the plurality of first electrodes,
wherein the driving circuit performs:
first driving operations for supplying the driving signals to a first electrode disposed at a first end portion of the detection region, or to each of a first number of first electrodes of two electrodes including the first electrode disposed at the first end portion of the detection region; and
second driving operations for supplying the driving signals to a first end portion and a second end portion of three of the plurality of first electrodes including a first electrode disposed at a first end portion of the detection region; and
wherein the driving circuit repeats the second driving operations a plurality of times by shifting each of the selected three first electrodes by two in the second direction,
wherein the two first electrodes in the first driving operations are disposed successively in the second direction,
wherein the three first electrodes in the second driving operations are disposed successively in the second direction,
wherein the driving circuit performs fifth driving operations for supplying the driving signals to a first electrode disposed at a second end portion of the detection region on an opposite side of the first end portion of the detection region in the second direction, or to each of a fourth number of first electrodes of two or more electrodes including the first electrode disposed at the second end portion of the detection region,
wherein the driving circuit repeats the second driving operations by shifting each of the selected second number of first electrodes by the third number to the second end portion of the detection region in the second direction,
wherein the fourth number of first electrodes in the fifth driving operations are disposed successively in the second direction, and
wherein the fourth number is less than the second number.

14. The display according to claim 13, wherein a width in the second direction of each of the plurality of first electrodes disposed at even-numbered positions from the first end portion of the detection region is smaller than a width in the second direction of each of the plurality of first electrodes disposed at odd-numbered positions from the first end portion of the detection region.

\* \* \* \* \*